United States Patent
Reyes et al.

(10) Patent No.: US 10,963,860 B2
(45) Date of Patent: Mar. 30, 2021

(54) DYNAMIC TRANSACTION RECORDS

(71) Applicants: Karla Reyes, New York, NY (US);
Lawrence Ho, Foster City, CA (US);
Leonardo Collado, Miami, FL (US);
Jaesung Park, San Francisco, CA (US);
Jinsheng Hu, San Francisco, CA (US)

(72) Inventors: Karla Reyes, New York, NY (US);
Lawrence Ho, Foster City, CA (US);
Leonardo Collado, Miami, FL (US);
Jaesung Park, San Francisco, CA (US);
Jinsheng Hu, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 707 days.

(21) Appl. No.: 15/190,834

(22) Filed: Jun. 23, 2016

(65) Prior Publication Data

US 2017/0372292 A1     Dec. 28, 2017

(51) Int. Cl.
*G06Q 20/32* (2012.01)
*G06Q 20/20* (2012.01)
(Continued)

(52) U.S. Cl.
CPC ......... *G06Q 20/325* (2013.01); *G06Q 20/047* (2020.05); *G06Q 20/209* (2013.01);
(Continued)

(58) Field of Classification Search
CPC .. G06Q 20/325; G06Q 20/047; G06Q 20/209; G06Q 20/3224; G06Q 20/389; G06Q 20/34; G06Q 20/405; H04W 4/021
See application file for complete search history.

(56) References Cited

U.S. PATENT DOCUMENTS 8,190,486 B1 * 5/2012 Ouimet ............ G06Q 30/02
                                                   705/26.1
8,326,315 B2 * 12/2012 Phillips .............. G08B 21/0261
                                                   455/456.1

(Continued)

OTHER PUBLICATIONS

Travel Recommendation Using Geo-tagged Photos in Social Media for Tourist, Authors: Imran Merron • Ling Chen • Abdul Majid • Mingqi Lv • Ibrar Hussain • Gencai Chen, pp. 1348-1349 and 1351, Published online: Oct. 14, 2014 Springer Science+Business Media New York 2014 (Year: 2014).*

(Continued)

*Primary Examiner* — Christopher Bridges
*Assistant Examiner* — Tony P Kanaan
(74) *Attorney, Agent, or Firm* — Loeb & Loeb LLP

(57) ABSTRACT

A transaction record linked to photos taken within geographic or temporal proximity to the various transactions of the record may create a visual way for consumers to interact with their transaction data. Payment transaction data including a customer identifier, a first geo-location of a point-of-sale terminal, and a transaction time stamp may be compared against a second geo-location of a user device associated with the customer identifier. In response to the first geo-location being within a predetermined distance of the second geo-location, an image may be retrieved or created. Transaction records may then show the payment transaction data and the image.

16 Claims, 19 Drawing Sheets

(51) Int. Cl.
  *G06Q 20/38*   (2012.01)
  *G06Q 20/34*   (2012.01)
  *G06Q 20/40*   (2012.01)
  *G06Q 20/04*   (2012.01)
  *H04W 4/02*    (2018.01)
  *H04W 4/021*   (2018.01)

(52) U.S. Cl.
  CPC ......... *G06Q 20/3224* (2013.01); *G06Q 20/34* (2013.01); *G06Q 20/389* (2013.01); *G06Q 20/405* (2013.01); *H04W 4/021* (2013.01)

(56) References Cited

U.S. PATENT DOCUMENTS

| | | | | |
|---|---|---|---|---|
| 8,364,552 | B2* | 1/2013 | Ciurea | G06Q 20/20 705/26.1 |
| 8,905,303 | B1* | 12/2014 | Ben Ayed | G06Q 20/32 235/380 |
| 9,460,464 | B2* | 10/2016 | Krishnan | G06Q 30/0633 |
| 9,462,445 | B2* | 10/2016 | Jo | G06K 9/6201 |
| 9,530,128 | B1* | 12/2016 | Bekmann | G06Q 20/20 |
| 9,881,303 | B2* | 1/2018 | Vohra | G06Q 20/202 |
| 10,115,083 | B1* | 10/2018 | Koeppel | G06Q 20/327 |
| 10,402,847 | B2* | 9/2019 | Marcus | G06Q 20/209 |
| 10,534,819 | B2* | 1/2020 | Ricci | B60Q 9/00 |
| 2012/0030107 | A1* | 2/2012 | Gibson | G06Q 20/42 705/43 |
| 2012/0268241 | A1* | 10/2012 | Hanna | G06F 21/32 340/5.52 |
| 2012/0278155 | A1* | 11/2012 | Faith | G06Q 20/40145 705/14.26 |
| 2013/0006857 | A1* | 1/2013 | Sinton | G06Q 20/20 705/44 |
| 2013/0282438 | A1* | 10/2013 | Hunter | G01S 1/72 705/7.32 |
| 2014/0074713 | A1* | 3/2014 | Neuwirth | G06Q 20/108 705/44 |
| 2014/0129949 | A1* | 5/2014 | Singer | H04W 4/021 715/733 |
| 2014/0279113 | A1* | 9/2014 | Balasubramanian | G06Q 20/20 705/21 |
| 2014/0351006 | A1* | 11/2014 | Christner | G06Q 20/023 705/7.29 |
| 2015/0046320 | A1* | 2/2015 | Baldwin | G07F 9/023 705/40 |
| 2015/0120562 | A1* | 4/2015 | Zhang | G06Q 20/3224 705/44 |
| 2015/0269557 | A1* | 9/2015 | Artman | G06Q 20/3224 705/41 |
| 2015/0317631 | A1* | 11/2015 | Lesbirel | G06Q 20/40145 705/44 |
| 2015/0348046 | A1* | 12/2015 | Battle | G06Q 20/12 705/44 |
| 2015/0356563 | A1* | 12/2015 | Vohra | G06Q 20/3224 705/44 |
| 2016/0078568 | A1* | 3/2016 | Trivedi | G06Q 40/02 705/33 |
| 2016/0321671 | A1* | 11/2016 | Chandrasekaran | G06Q 20/326 |
| 2016/0350762 | A1* | 12/2016 | Blanchard | G06Q 20/40145 |
| 2017/0024739 | A1* | 1/2017 | Todasco | G06Q 20/14 |
| 2017/0061461 | A1* | 3/2017 | Jajara | G06Q 20/405 |
| 2017/0098209 | A1* | 4/2017 | Laracey | G06Q 30/0253 |
| 2017/0148075 | A1* | 5/2017 | High | A47F 10/04 |
| 2017/0270510 | A1* | 9/2017 | Kattimani | G06Q 20/3278 |
| 2017/0372292 | A1* | 12/2017 | Reyes | G06Q 20/389 |
| 2018/0114219 | A1* | 4/2018 | Setchell | H04L 63/102 |
| 2018/0225749 | A1* | 8/2018 | Shoen | G06Q 30/0645 |
| 2019/0378124 | A1* | 12/2019 | Ferrilla | H04W 4/025 |

OTHER PUBLICATIONS

EP Extended Search Report dated Nov. 8, 2017 for EP App. No. 17176063.0, 9 pages.

* cited by examiner

DYNAMIC TRANSACTION RECORDS

FIELD OF TECHNOLOGY

The present disclosure relates to a method and system for linking dynamic information to a payment device transaction record.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Payment devices such as credit cards, mobile-devices that are linked to credit accounts, fobs with wireless payment technology, and others are tied to an account that, among other functions, tracks the use of that account. For example, a typical transaction record includes payment device information and particulars about each transaction that was completed with the payment device during a given period of time. Particulars have traditionally included a payment amount, date and time of the transaction, and textual information to allow the account holder to identify the recipient of the payment through the user's account. However, traditional transaction records include only text information to convey particulars with no way to interact with the transaction record data or to facilitate other tasks that are related to the data.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a system may obtain a photo (e.g., a selfie) from the user's mobile device. Timestamp or other data associated with the photo may indicate that it was taken at about the same time, location, or other data to associate the photo with the occurrence of a payment transaction (e.g., mobile payment, credit card swipe, etc.). The system may then create a credit card statement with photos corresponding to each transaction. In some embodiments, the system may also aid a user in finding the best currency exchange rates while traveling, provide offers based on a user's current geo-location, and prompt a friend to pay a user back for an expense. For example, the system may allow a user to send a friend an "IOU" request including the selfie taken at the time of payment as a reminder that the friend incurred the expense.

A computer implemented system and method may present a solution to transaction data records described above. In some embodiments, a method may receive, from a point of sale terminal, a payment transaction data comprising a customer identifier, a first geo-location of the point-of-sale terminal, and a transaction time stamp. The method may then determine a second geo-location of a user device associated with the customer identifier and, in response to the first geo-location being within a predetermined distance of the second geo-location, retrieve an image from the user device generated within a predetermined time of the transaction time stamp. The method may then create a transaction record comprising the payment transaction data and the image. The transaction record may be one of a plurality of transaction records. Then, for a predetermined time period, the method may identify a subset of the transaction records that include the customer identifier and create an interactive transaction statement comprising images from the transaction records subset. The method may also communicate the interactive transaction statement for display by the user device.

In further embodiments, a payment device transaction record system may comprise a payment processing server and a mobile computing device. The payment processing server may receive payment transaction data including a first geo-location corresponding to a point-of-sale terminal and a transaction timestamp. The mobile computing device may compare the first geo-location to a second geo-location corresponding to photo data. The photo data may include a digital image. In response to the first geo-location being within a threshold distance of the second geo-location, a module may execute an instruction using a processor of one or more of the payment processing server and the mobile computing device to link the payment transaction data to the photo data.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
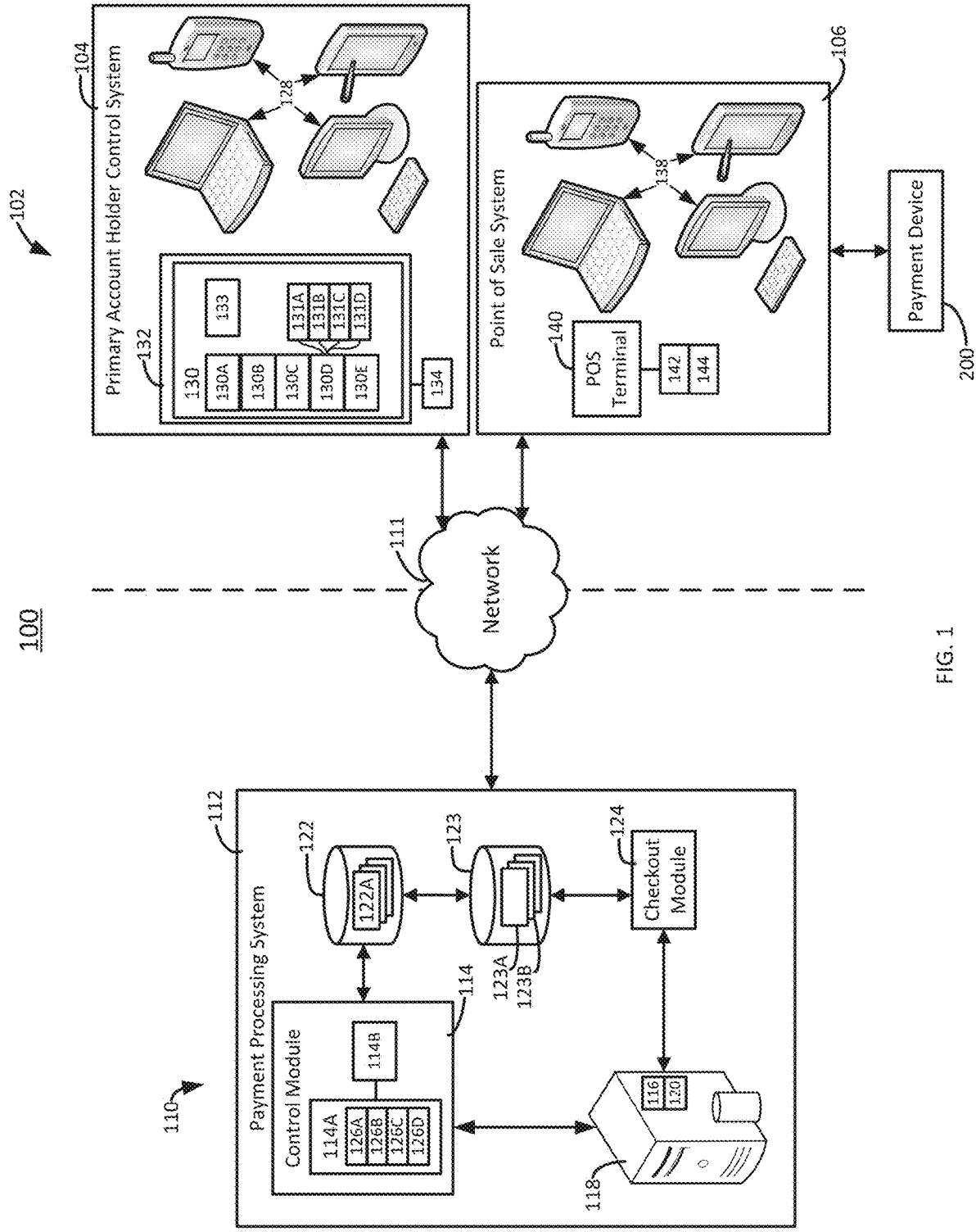
FIG. 1 illustrates a system for linking dynamic information to a payment device transaction record as described herein.

FIG. 1 generally illustrates one embodiment of a system 100 for creating and using dynamic transaction records as described herein. The system 100 may include front end components 102 (e.g., a primary account holder control system 104, a point of sale system 106, a payment device 200, etc.) and backend components 110 (e.g., a payment processing system 112). The front end components 102 and backend components 110 may be in communication with each other via a communication link 111 (e.g., computer network, internet connection, etc.). The system 100 may include various software or computer-executable instructions and specialized hardware components or modules that employ the software and instructions to provide a primary account holder with dynamic transaction records as described herein. The various modules may be implemented as computer-readable storage memories containing computer-readable instructions (i.e., software) for execution by a processor of the computer system 100 within a specialized or unique computing device. The modules may perform the various tasks associated with creating and using a dynamic transaction record as described herein. The computer system 100 may also include both hardware and software applications, as well as various data communications channels for communicating data between the various specialized or unique front end 102 and back end 110 hardware and software components.

Figure 2A:
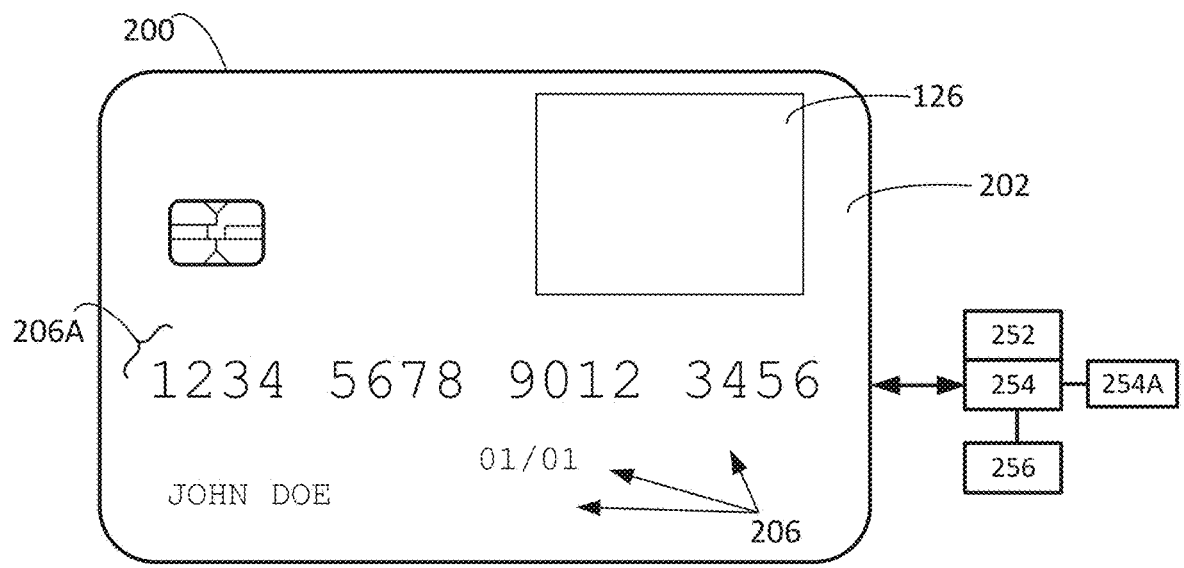
FIGS. 2A and 2B illustrate different views of an exemplary payment device for use with the system for linking dynamic information to a payment device transaction record as described herein.
Figure 2B:
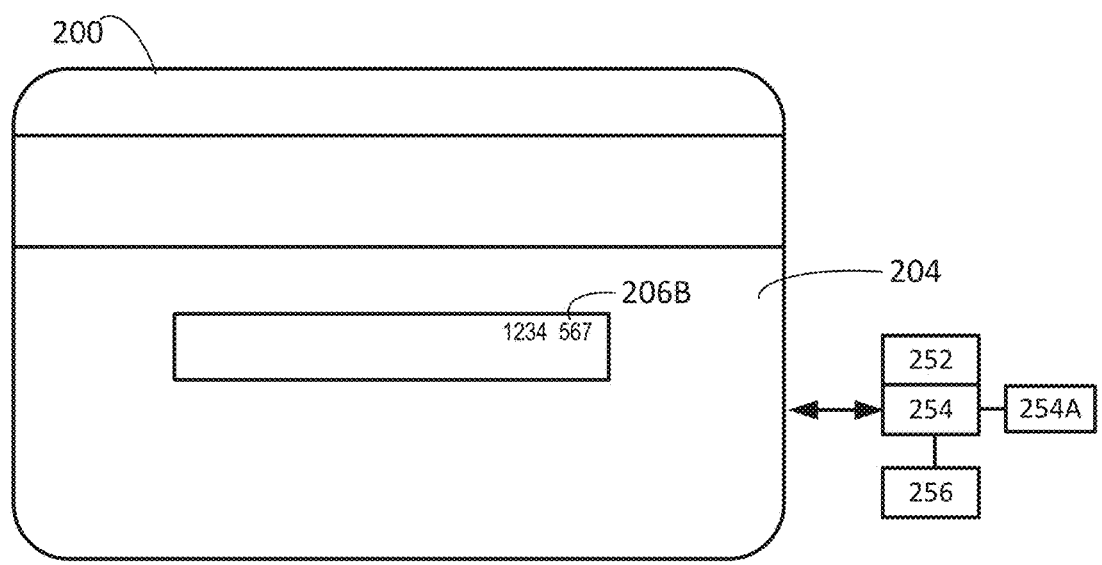

The payment processing system 112 may include one or more instruction modules including a control module 114 that, generally, may include instructions to cause a processor 116 of a payment processing server 118 to functionally communicate with a plurality of other computer-executable steps or modules 114A, 114B, and 114C. These modules 114, 114A-C may include instructions that, upon loading into the server memory 120 and execution by one or more computer processors 116, provide a primary account holder with a dynamic transaction record of purchases using a payment device 200 (FIGS. 2A and 2B). A first data repository 122 may include primary account holder data profiles 122A that each include various pieces of data to describe an account of a primary account holder and user of the payment processing system 112. This data 122A may be included with the payment device 200 as described herein. A second data repository 123 may include a plurality of dynamic transaction records, for example, a first dynamic transaction record 123A, a second dynamic transaction record 123B, etc., corresponding to each primary account holder data profile 122A. The records 123A may each include various pieces of data to describe a transaction of a primary account holder and user of the payment processing system 112. In some embodiments, the records 123A may include a time, an amount, a location, a purchase category, photo data, and other data as described herein.

The point of sale system may include any components that are used by a business to complete a transaction using a customer's payment device 200. For example, the system 106 may include a point-of-sale terminal 140 that is used by one or more computing devices 138 to gather customer account information (e.g., a Primary Account Number ("PAN") 206A and a Card Verification number ("CVN") 206B). The terminal 140 may include both a memory 142 and processor 144 to execute instructions to send the account information and other transaction information to the payment processing system 112.

With brief reference to FIGS. 2A and 2B, an exemplary payment device 200 (FIGS. 2A and 2B) may take on a variety of shapes and forms. In some embodiments, the payment device 200 is a traditional card such as a debit card or credit card. In other embodiments, the payment device 200 may be a fob on a key chain, an NFC wearable, or other device. As long as the payment device 200 is able to communicate securely with a point of sale system, 106, the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the faces 202, 204 may have some embossments 206 including the PAN 206A and the CVN 206B. In some embodiments, the payment device 200 may include data corresponding to the primary account holder, such as a primary account holder data profile 122A for the primary account holder. A memory 254 generally and a module 254A in particular may be encrypted such that all data related to payment is secure from unwanted third parties. A communication interface 256 may include instructions to facilitate sending payment information or a token to identify payment information to the point-of-sale system 106, which then passes the payment data/token to the payment processing system 112 via the network 111.

Returning to FIG. 1, a checkout module 124 of the payment processing system 112 may include various instructions that, upon execution by the processor 116, facilitate employing a payment device 200 for a financial transaction. The module 124 may include instructions that, upon loading into the server memory 120 and execution by one or more computer processors 116, allow a user to employ the payment device 200 and his or her corresponding account data 122A to complete a payment using, for example, the PAN 206A and other data from the payment device and also coordinate with the control module 114 and a dynamic transaction records module 130 to permit interaction with a dynamic transaction record 123A as described herein. In some embodiments, the checkout module 124 may include instructions to process payments or other transaction data 146 during an in-person or online financial transaction between a primary account holder and a merchant using the payment device 200 and point-of-sale system 106, respectively. For example, the module 124 may include instructions to access account data 122A corresponding to the primary account holder for the payment device 200 used in the transaction and create a dynamic transaction record 123A.

The control module 114 may also include instructions to coordinate execution of other instructions to link photos, reviews, social media capabilities, and other payment options to a transaction record 123A. For example, a link module 114A may include instructions to cause a dynamic transaction records module 130 stored in a memory 132 on a primary account holder computing device 128 to display a plurality of interfaces (e.g., 130A-E, 131A-D) within a display of the user computing device 128. In some embodiments, the display may include a browser or other application stored in the memory 132 and executed on a processor 134 of the computing device 128 to display an output of the dynamic transaction records module 130.

The dynamic transaction records module 130 may include several elements including a dynamic consumer controls module 130A, a foreign exchange rates module 130B, a loyalty platform module 130C, an a transaction record module 130D, and an alerts module 130E which may include several sub-modules to implement particular functions with a single transaction record 123A or to collectively display information related to a plurality of transaction records 123A. For example, the transaction record module 130D may include several sub-modules including a direct payment module 131A, a social media module 131B, a micro transactions module 131C, and a transaction gallery module 131D. Any of the interfaces or modules stored in the memory 132 may be used to configure the user computing device 128 to facilitate both creating dynamic transaction report records 123A and completing the actions described herein that may be performed with the records 123A. In other embodiments, one or more of the interfaces and modules (i.e., 130, 130A, 130B, 130C, 130D, 130E, 131A, 131B, 131C, 131D) may be stored in a memory of the payment processing system 112 or multiple computing devices in a cloud-based model of execution and served to the computing device 128 via the network 111 when requested.

Figure 2C:
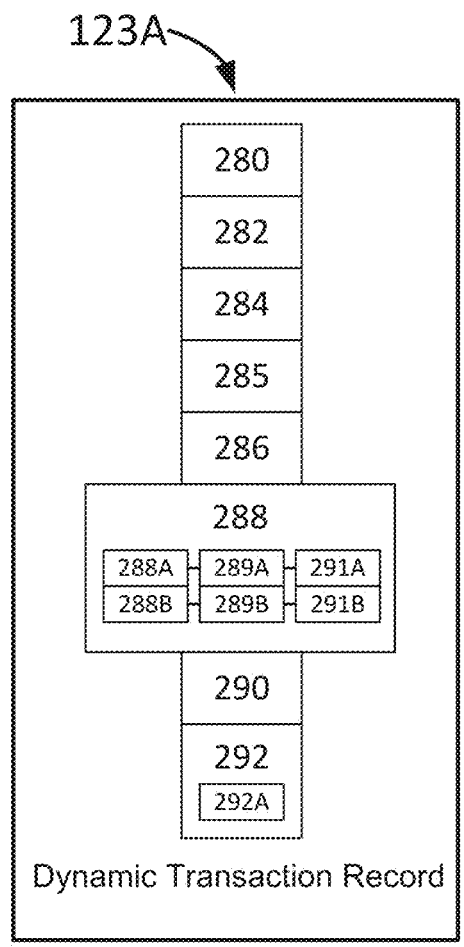
FIG. 2C illustrates an exemplary block diagram of a dynamic transaction record.

With brief reference to FIG. 2C, a dynamic transaction record 123A may include various items of data to describe a transaction that uses the payment device 200. The record 123A may be stored in a memory of a computing device (e.g., the data repository 123 of the payment processing system 112) in a secure format. The record 123A may include a data structure or collection of data elements to provide a user, via a mobile or other type of computer application, a dynamic and interactive view of transactions using a payment device 200 registered with the user. For example, in some embodiments, the dynamic transaction record 123A may include one or more of a cost 280, a location 282, a time 284, a customer identification 285 (e.g., a primary account number or "PAN"), business information 286, a photo 288, social media links 290, IOU links 292, etc., and any or all of these data items may be part of or linked to a single record 123A or a plurality of records 123A.

The cost 280 may include the total transaction price for a good or service using the payment device 200. The location 282 may include a payment location such as a GPS coordinate received from a location module of the computing device 128 that initiated the payment, or other location data associated with the user of the payment device. Time 284 may include a time that the payment device 200 was used to complete a payment transaction for a good or service. Business information 286 may include a name, a geo-location of a POS terminal 140, a geo-location of the business building, a street address, or other location information, a telephone number, email, or other contact information, of the transaction.

The photo 288 may include data describing an image stored on the computing device 128, taken by the device 128 or otherwise attributable or linked to one or more other data items (280, 282, 284, 286) of the record 123A or linked to one or more records 123A. For example, upon completing a payment transaction with the payment device 200, the dynamic transaction records module 130 may automatically link a computing device photo 288A to the transaction record 123A. The computing device photo 288A may include photo data corresponding to an image taken with and stored on the computing device 128 executing the module 130 at the time and/or location of the transaction. The photo 288A may include time data 289A and location data 291A indicating when and where the photo 288A was taken. For example, upon completing the transaction, the module 130 may execute instructions to search for a photo 288A that is associated with the owner of the payment device. The photo data may be stored on the user's computing device 128 or linked to a cloud-based photo storage account of the user, or otherwise associated with the user of the payment device 200 used in the transaction. The module 130 may search for a computing device photo 288A that includes timestamp data 289A and/or location data 291A corresponding to the transaction time 284 and business information 286, respectively. When the module executes an instruction to determine that one or more of the time and location of the photo 288A and the transaction match (i.e., the photo time 289A matches the transaction time 284 and/or the photo location 291A matches the business information 286), then the module 130 may link the computing device photo 288A to the dynamic transaction record 123A for that time 284 and information 286. When the module 130 executes an instruction to determine that no computing device photo 288A matches the transaction time 284 and/or business information 286, then the module may execute another instruction to link other photo data 288B to the record 123A associated with that current transaction. In some embodiments, the module 130 may execute an instruction to link a photo from a web presence of the merchant of the good or service that is the subject of the transaction. For example, the module 130 may execute an instruction to link a photo 288B from the merchant's website, from a web-based mapping application, from a social media account for the merchant, or other internet-based sources. The photo 288A may also include time data 289B and location data 291B. In other embodiments, the module 130 may execute an instruction to display a user interface on the computing device 128 which will allow the user to take a photo (e.g., a "selfie" or other photo) immediately after or during the transaction and the module will link that photo to the record 123A.

The social media links 290 may allow a user to post information to social media sites regarding the transaction that creates a dynamic transaction record 123A. In some embodiments, the module 130 may include instructions to display a link to one or more social media sites on the computing device 128 during or after the transaction. The module 130 may also include instructions to link a review of the goods or services through the dynamic transaction record 123A. By way of this link between the review and the record 123A, the review may be confirmed as authentic and originating with an actual transaction. In further embodiments, the module 130 may include instructions to pre-populate a post to a review or other social media site with the business information 286, photo data 288, or other data related to the record 123A.

IOU links 292 may include information to link a record 123A or portions of a record 123A to another account or identifying information for another user. In some embodiments, the module 130 may include instructions to send an IOU message 292A including a record 123A or portions of a record 123 to another user. The module 130 may also include instructions to include an indication of an amount owed by the other user in association with the dynamic transaction record 123A. In further embodiments, the message 292A may include photo data 288 or any of the other data (e.g., the cost 280, location 282, time 284, business information 286, social media links 290, etc.) automatically or optionally added by the module 130.

While the dynamic transaction record 123A is described as including various different types of data, those skilled in the art will recognize that the record 123A may include other types of data that could be related to a transaction such as physical distance from other transactions, number of transactions in the area, similar product information, discounts or coupon information for items related to the transaction, etc.

Figure 3A:
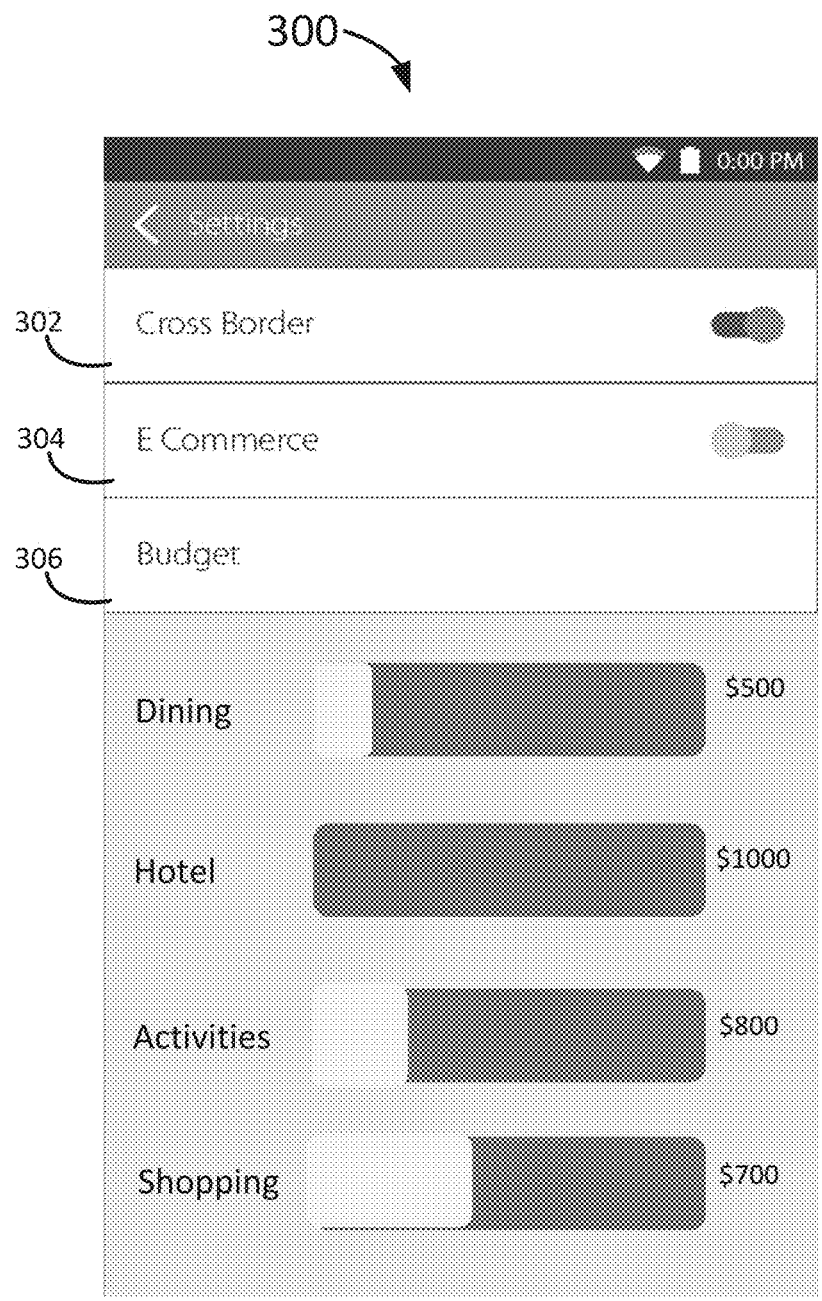
FIG. 3A illustrates an exemplary consumer controls interface for use with the system for linking dynamic information to a payment device transaction record as described herein.
Figure 3B:
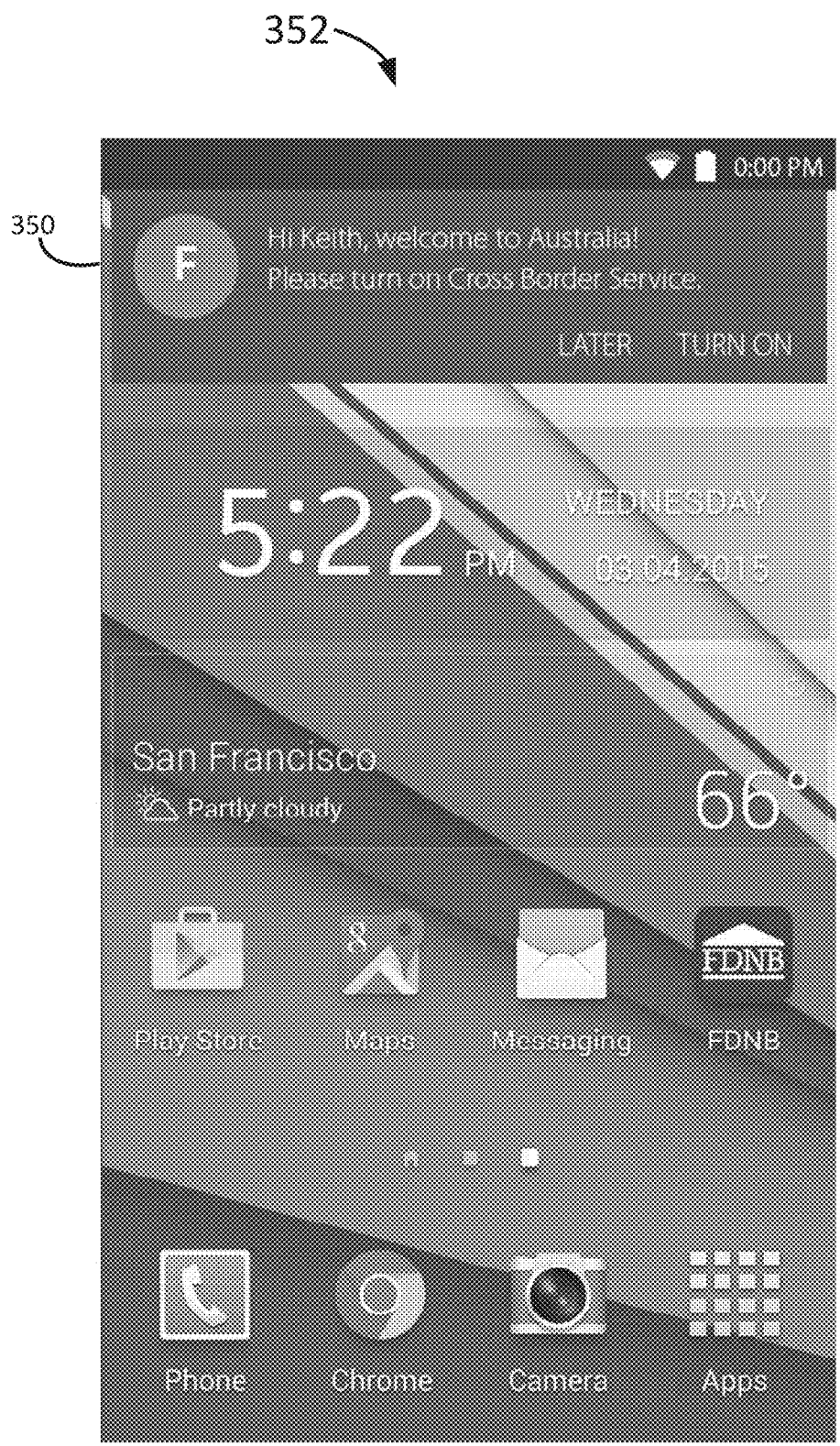
FIG. 3B illustrates an exemplary cross-border indication within an interface for use with the system for linking dynamic information to a payment device transaction record as described herein.

In conjunction with the dynamic transaction records module 130, the dynamic consumer controls module 130A may include instructions stored in the memory 132 to configure one or more settings of the dynamic transaction records module 130. With reference to FIG. 3A, the dynamic consumer controls module 130A may include instructions to configure the dynamic transaction records module 130 to display a consumer controls interface 300. The consumer controls module 130A may also include instructions to set a graphic representation of a cross border variable 302, an e-commerce variable 304, and to modify budget controls variables 306. The cross border variable may cause the dynamic transaction records module 130 to send a message or other indication to the payment processing system 112 to indicate that a computing device (e.g., computing device 128) executing the dynamic transaction records module 130 has physically entered a geographic area that might otherwise indicate a payment security threat. For example, in some embodiments, when a GPS module 133 executing on the computing device 128 sends a message to the dynamic transaction records module 130 that indicates the computing device 128 has crossed an international border, one or more of the modules (i.e., the alerts module 130E) may indicate within a user interface of the device 128 that the cross border variable 302 should be changed. For example, with reference to FIG. 3B, a cross-border indication 350 may be displayed within a user interface 352 of a device 128 executing the module 130. The alerts module 130E may include access to transaction records 123A that indicate an airline ticket purchase and information or other transportation purchase for a user of the system described herein to travel to an international destination. In some embodiments, where the device's current location and the ticket information match, the alerts module 130E may execute an instruction to display an indication to the user change the cross border variable 302. The cross border variable 302 may configure the payment device 200 in general and the payment processing system 112 in particular to accept international transactions corresponding to both the ticket destination and the current location of the device 128.

With further reference to the consumer controls interface 300 of FIG. 3A, an e-commerce variable 304 may be changed within the interface 300 to indicate that the user authorizes the payment processing system 112 to accept transaction records 123A indicating an on-line transaction. Further, one or more budget variables 306 may allow the user to configure the payment processing system 112 generally and a payment device 200 in particular to limit categories of purchases to a particular amount. For example, as illustrated in FIG. 3A, budget variables may include categories of transaction expenses such as dining, hotel, activities, shopping, and other items. While the budget variables 306 in FIG. 3A indicate only four categories, the module 130 may be configured to accept any number of categories and limits. The budget variables 306 may then be used to configure the alerts module 130E to display an indication of when a budget variable amount reaches a particular level. For example, with reference to FIG. 3D, the one or more budget variables 306 may configure a dynamic transaction record interface 375 to display a budget indication 378 upon receiving an indication from the payment processing system 112 that a number of transaction records 123A show the user exceeding one or more of the budget variables 306.

Figure 3C:
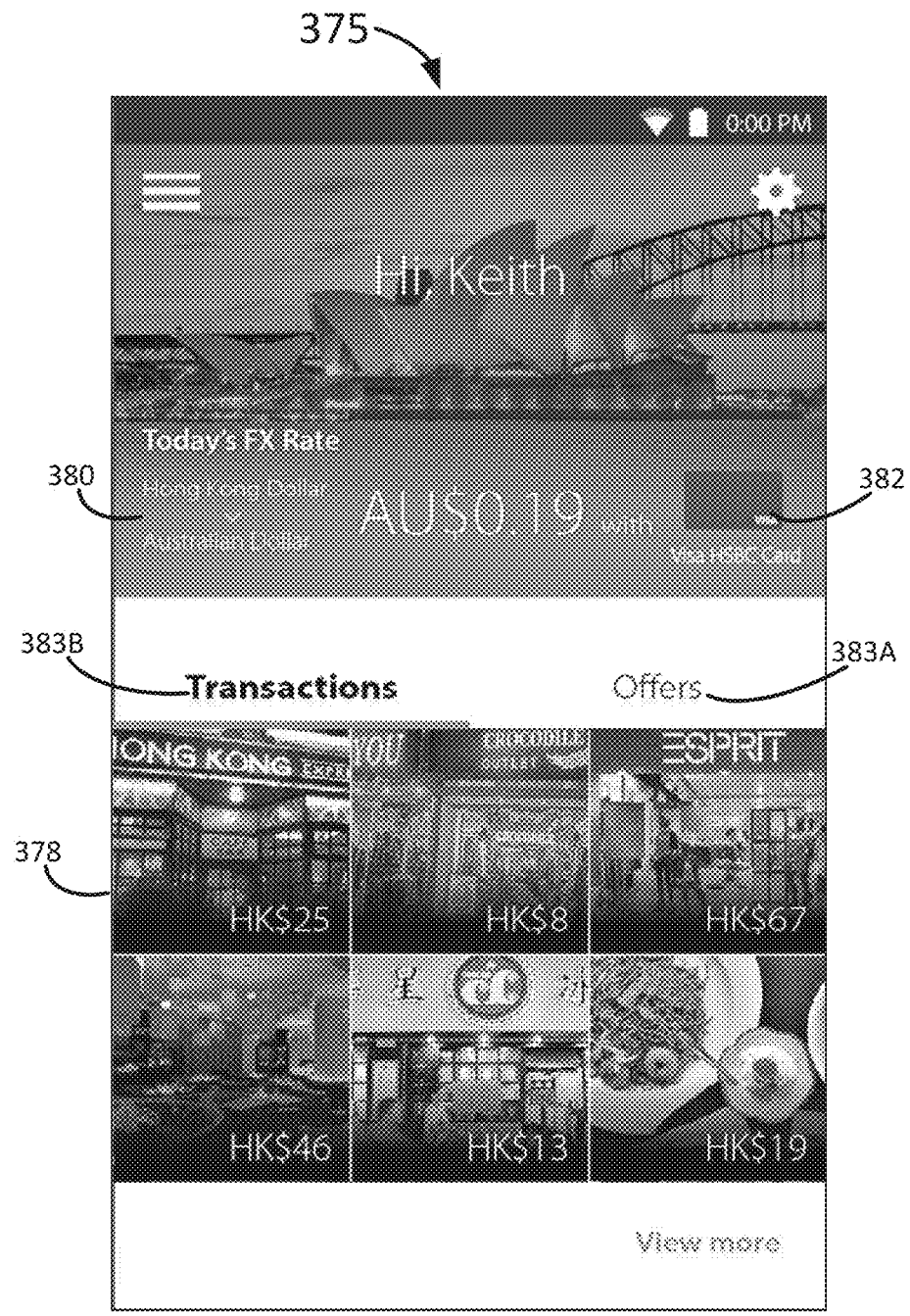
FIG. 3C illustrates an exemplary home page interface for use with the system for linking dynamic information to a payment device transaction record as described herein.

With reference to FIG. 3C, a home page interface 375 may display one or more graphic representations 378 of the dynamic transaction records 123A including some or all of the data for the records 123A (e.g., 280, 282, 284, 286, 288, 290, 292). In some embodiments, the transaction record module 130E my include instructions to display the graphic representations 378 to include the photo data 288 from one or more dynamic transaction records 123A and/or a cost 280. The home page interface 375 may also include other information related to the location of the computing device 128 or the records 123A including exchange rate data 380, a payment device indication 382, or other data. For example, the foreign exchange rates module 1308 may include instructions to gather and cause the display of the exchange data 380 within the interface 375.

Figure 3D:
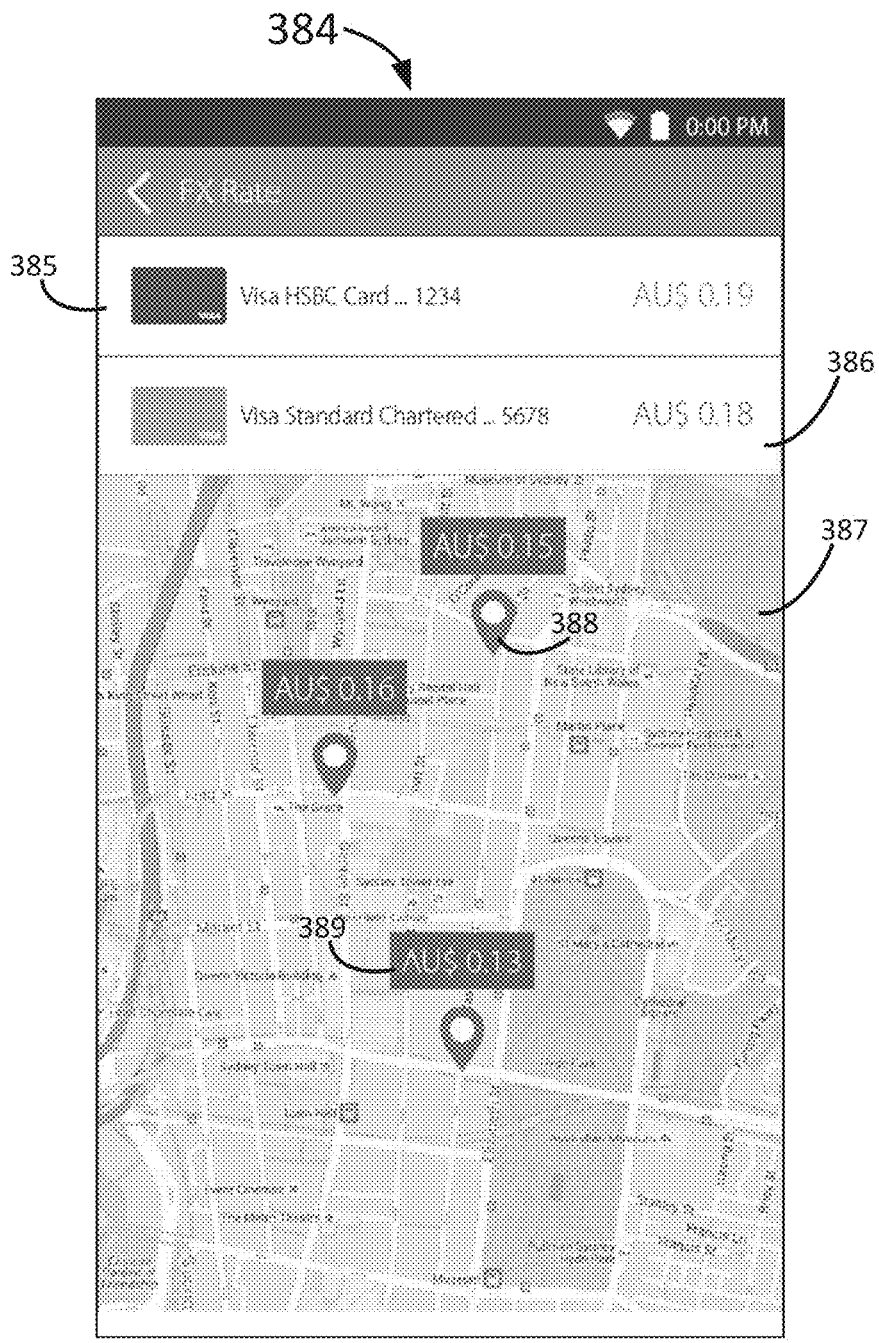
FIG. 3D illustrates an exemplary foreign exchange rates interface for use with the system for linking dynamic information to a payment device transaction record as described herein.

With brief reference to FIG. 3D, upon selection of the exchange data 380, the foreign exchange rates module 1308 may cause the computing device 128 to display a foreign exchange rates interface 384. The foreign exchange rates interface 384 may include a representation of one or more payment devices 385 and exchange rates for those devices 386 and a map 387 including one or more currency exchange locations 388 and rates 389 at those locations.

Figure 3E:
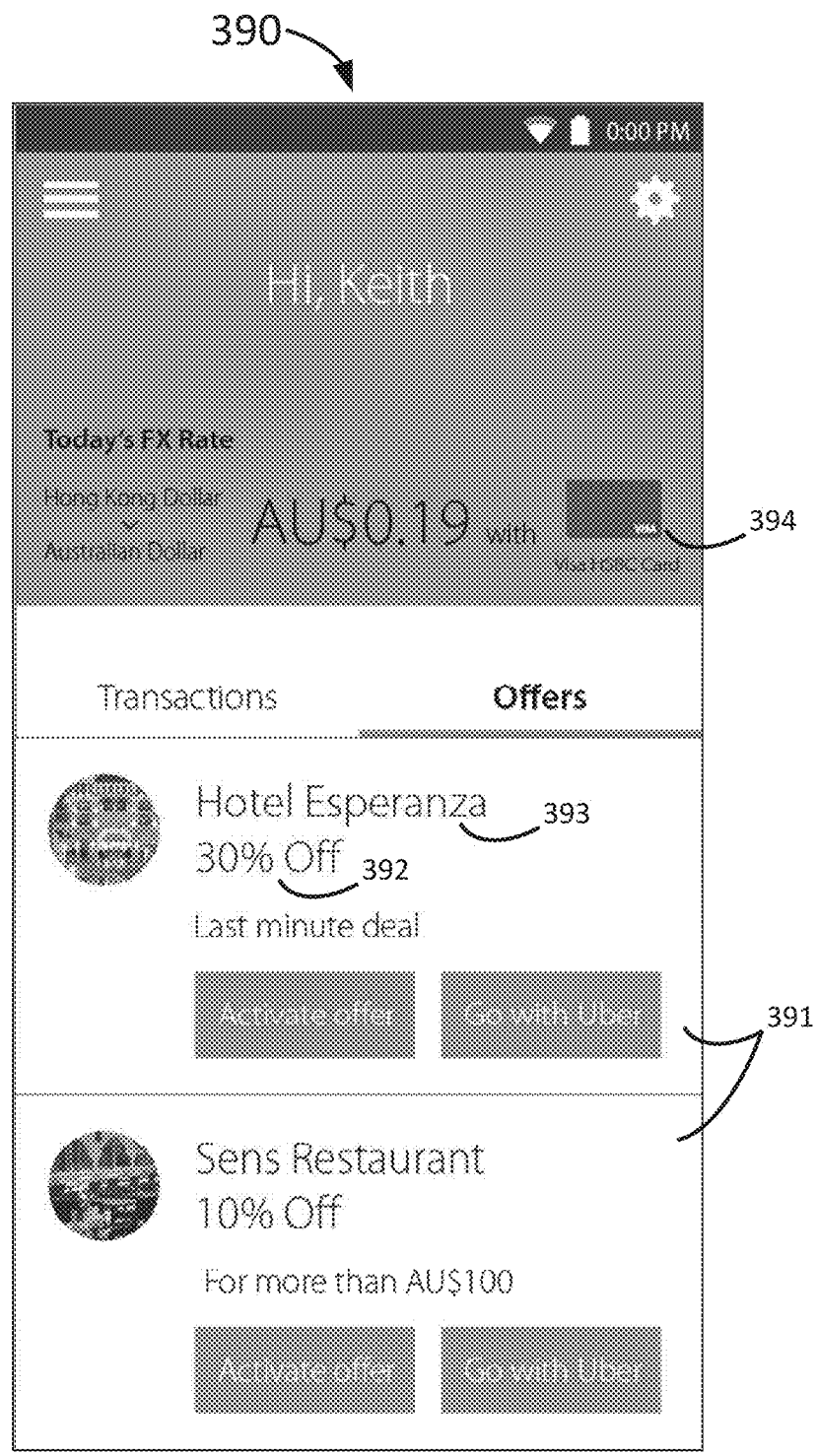
FIGS. 3E and 3F illustrate different views of an exemplary loyalty platform service interface for use with the system for linking dynamic information to a payment device transaction record as described herein.
Figure 3F:
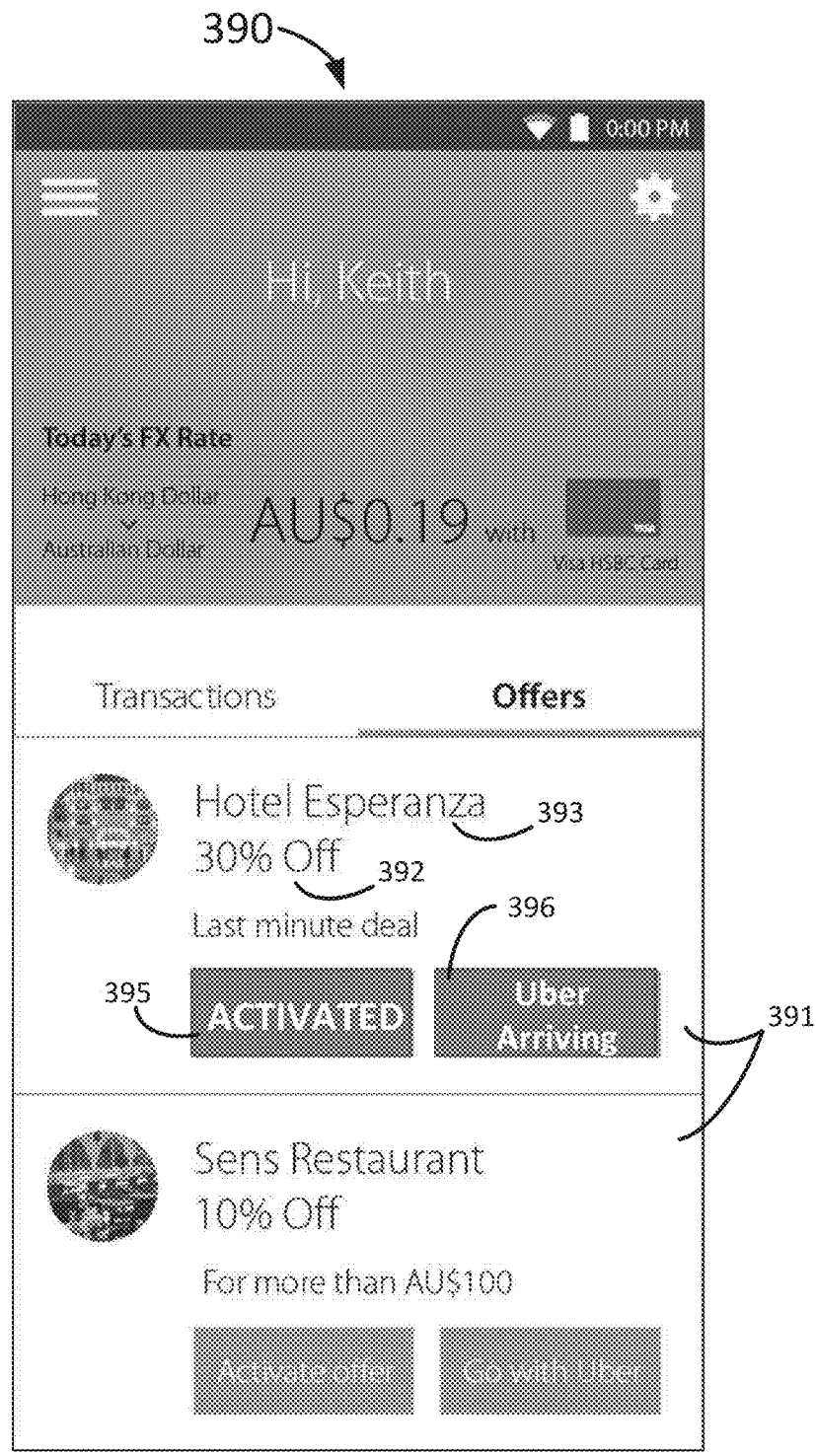

With reference to FIG. 3E, upon selection of the offers indication 383A (FIG. 3C), the loyalty platform module 130C may cause the computing device 128 to execute instructions to display a loyalty platform service interface 390. The interface 390 may include one or more offers 391 for discounts 392 or other benefits from a transaction involving a displayed good or service 393 that is completed using a payment device 200 having a graphic representation of the payment device 394 also displayed within the interface 390. With brief reference to FIG. 3F, the interface 390 may also include one or more graphic elements 395 that, upon selection by a user from the computing device 128, may cause the loyalty platform module 130C to execute an instruction to create a dynamic transaction record 123A for the displayed good or service 393 including the displayed discount 392. In some embodiments, a further graphic element 396 may be selected by a user from the computing device 128, to cause the loyalty platform module 130C to execute an instruction to create another dynamic transaction record 123A for a good or service that is not included in the offer 391. In some embodiments, activation of the further graphic element 396 may cause the module 130C to create a dynamic transaction record 123A for a good or service that is associated with or would be useful in conjunction with the displayed good or service 393. Some or all data (e.g., 280, 282, 284, 286, 288, 290, or 292) from the dynamic transaction record 123A that was created by the loyalty platform module 130C upon selection of the first graphic element 395 may be shared with a business entity associated with the second graphic element 396. For example, the further graphic element 396 may be associated with a transportation service. Upon selection of the further graphic element 396, the business information 286 including a business address associated with the displayed good or service 393 may be sent to the transportation service associated with that further graphic element 396. Of course other dynamic transaction record data may be shared with businesses associated with the further graphic element such as the photo data 288 may be shared with a photo printing service.

Figure 4:
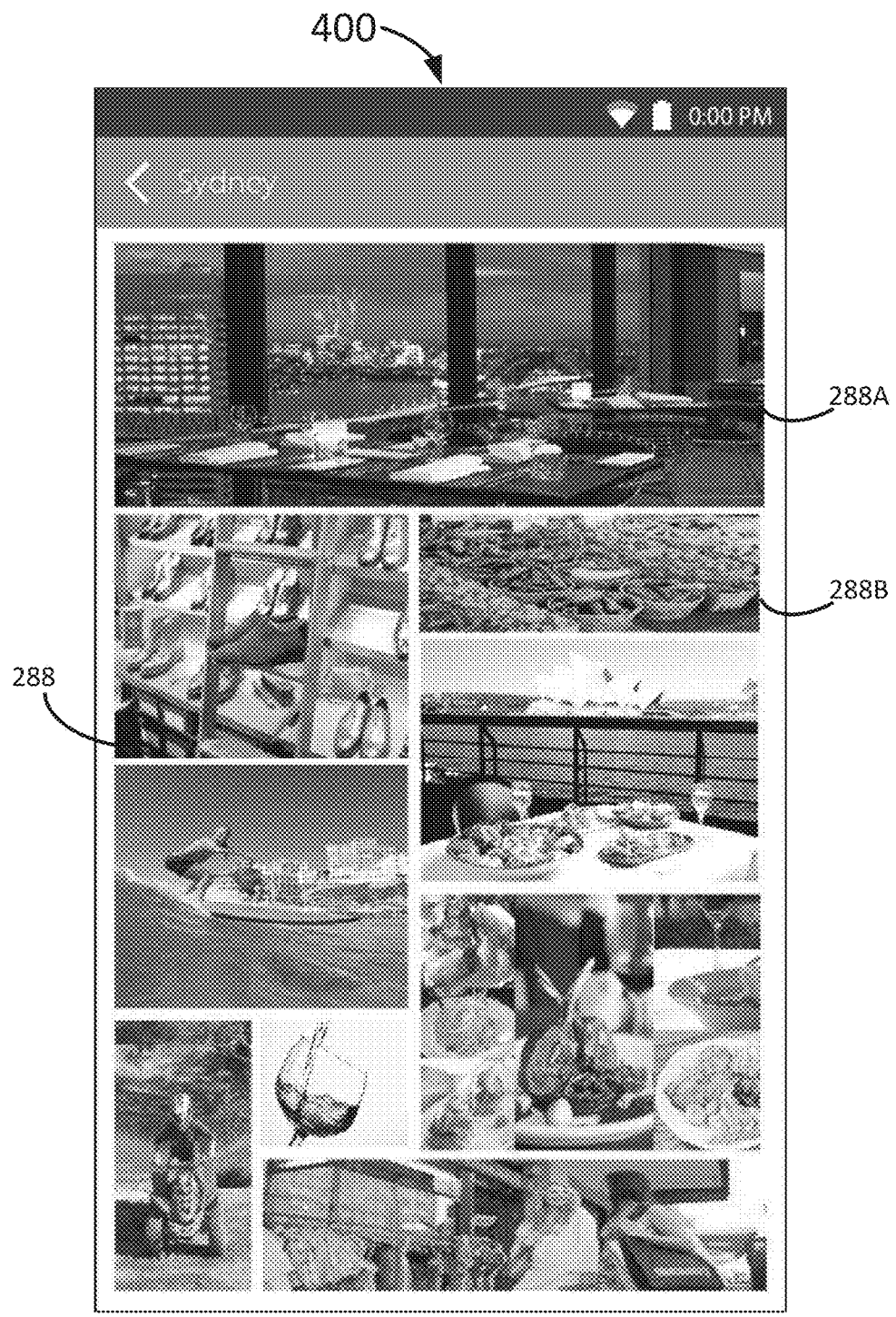
FIG. 4 illustrates an exemplary transactions gallery for use with the system for linking dynamic information to a payment device transaction record as described herein.

With reference to FIG. 4, a upon selection of the transactions indication 383B (FIG. 3C), the transaction records module 130D may cause the computing device 128 to execute instructions to display a transaction gallery 400. The transactions gallery 400 may include data from a plurality of dynamic transaction records 123A. In some embodiments, the gallery 400 may display the photo data 288 corresponding to each of the records 123A associated with a particular primary account holder, payment device 200, or other associations. In some embodiments, the transactions gallery module 131D of the transaction records module 130D may execute instructions to format each of the of the photo data 288 according to one or more other data. For example, the transactions gallery module 131D may execute instructions to modify an appearance (e.g., size, shading, border color, etc.) of the photo data 288 displayed within the transaction gallery 400 according to the cost data 280 of the dynamic transaction record 123A for the photo data 288. Where the cost data 280 for a first dynamic transaction record 123A is greater than the cost data 280 for a second dynamic transaction record 123B, the transactions gallery module 131D may execute an instruction to display the photo data 288 of the first dynamic transaction record 123A in a different format the second dynamic transaction record 123B. For example, when the transactions gallery module 131D executes an instruction to determine that the cost data 280 for the first dynamic transaction record 123A is greater than the cost data 280 for the second dynamic transaction record 123B, the transactions gallery module 131D may execute another instruction to display the photo data 288A for the first dynamic transaction record in a larger size than the photo data 288B for the second dynamic transaction record.

Figure 5A:
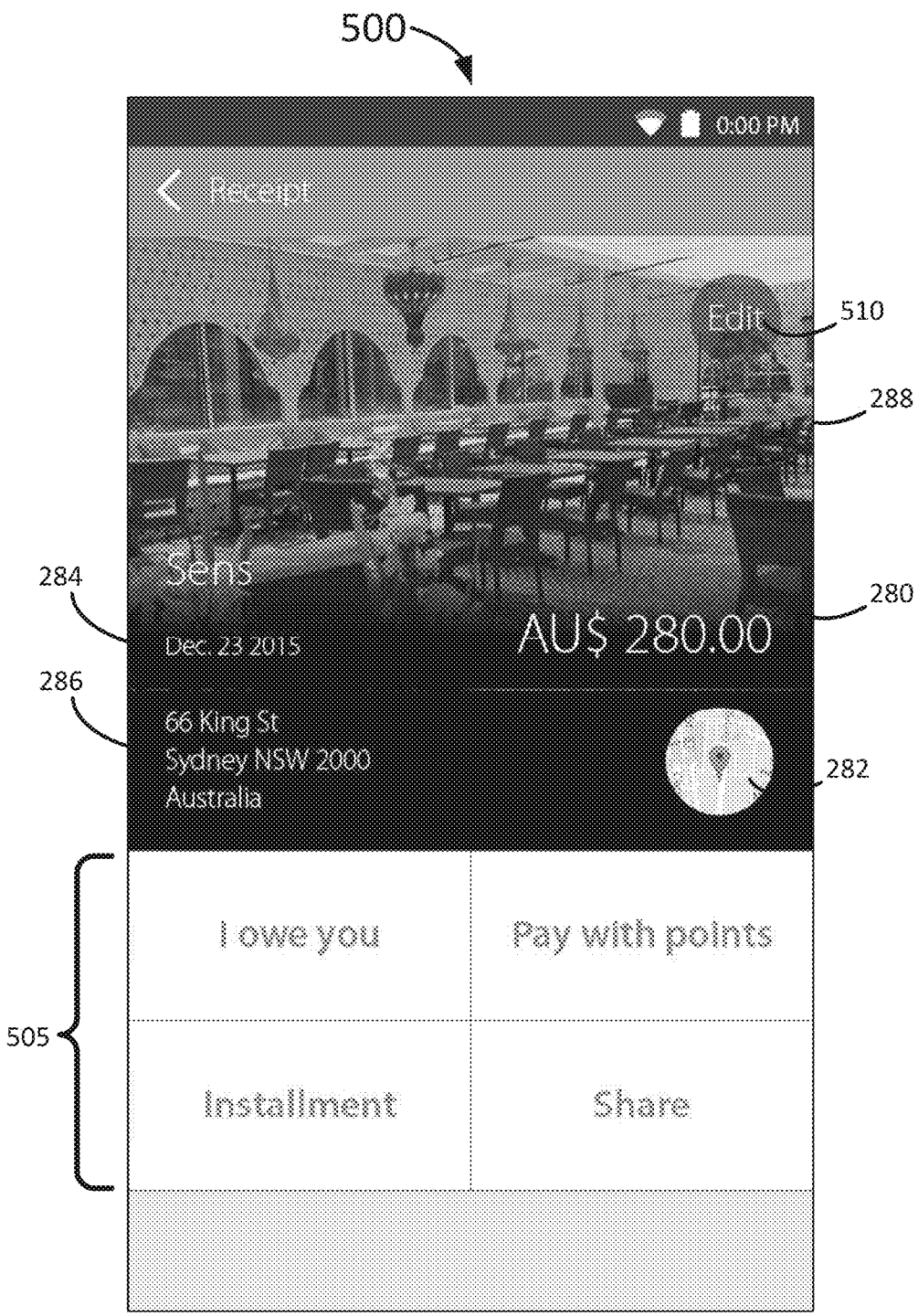
FIGS. 5A and 5B illustrate different views of an exemplary record detail interface for use with the system for linking dynamic information to a payment device transaction record as described herein.
Figure 5B:
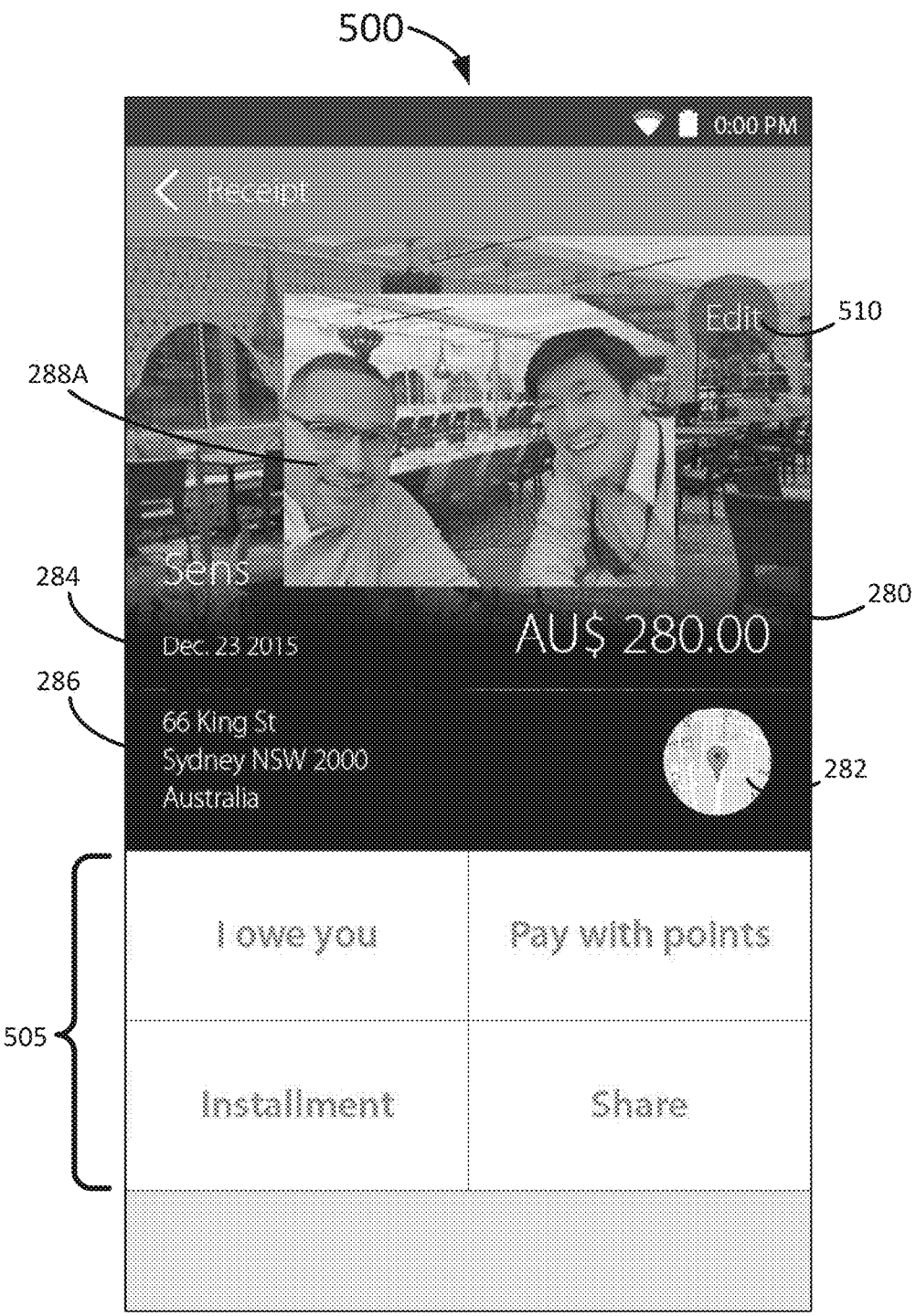

With reference to FIG. 5A, selection of any of the photos 288 within the transaction gallery 400 may cause the transaction record module 130D to execute an instruction to display a record detail interface 500 including data corresponding to the dynamic transaction record 123A of the selected photo data 288. In some embodiments, the module 130D may execute instructions to display the photo data 288 from the selected photo along with the cost data 280, business information 286, location data 282, time 284, a customer identifier 285, and various first graphic elements 505 for other functions that may be performed with the dynamic transaction record 123A. The interface 500 may also include one or more second graphic elements 510 that, upon selection, cause the module 130D to execute other functions, too. For example, selection of the second graphic element may cause the module 130D to execute an instruction to modify the photo data 288. In some embodiments, the module 130D may execute an instruction to insert a recent photo including data that corresponds to the dynamic transaction record data 123A (e.g., a photo 288A as described above), another photo 288B stored on the computing device 128, a "selfie," etc. For example, with brief reference to FIG. 5B, selection of the second graphic element 510 may cause the module 130D to execute an instruction to take and insert a "selfie" photo to replace or augment any of the photo data 288 associated with the record 123A.

Figure 6:
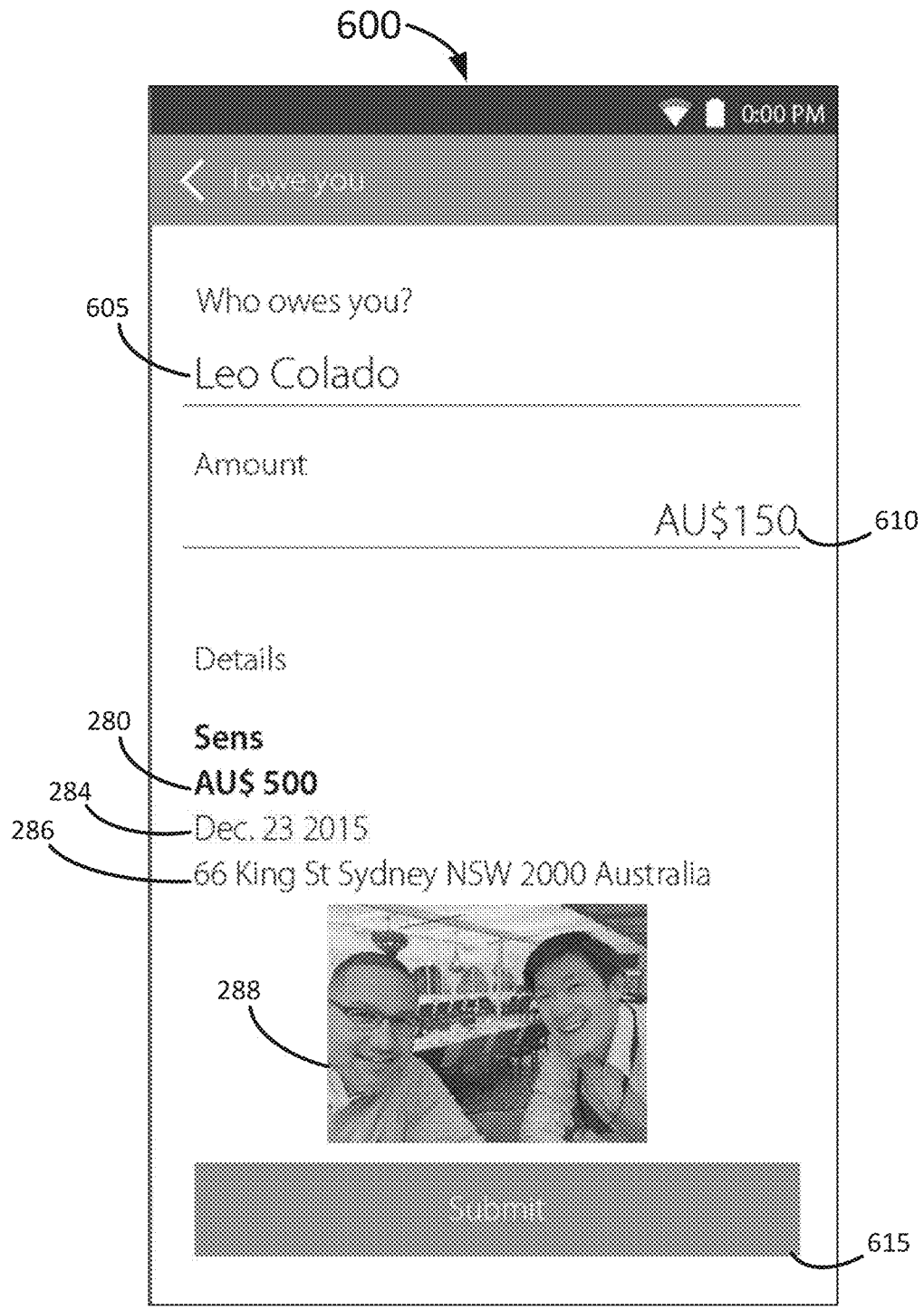
FIG. 6 illustrates an exemplary direct payment interface for use with the system for linking dynamic information to a payment device transaction record as described herein.

Selection of any of the first graphic elements 505 may cause the module 130D to execute one or more submodules to perform various actions with the dynamic transaction record 123A. In some embodiments, with reference to FIG. 6, selection of one of the first graphic elements 505 may cause the direct payment module 131A to display a direct payment interface 600. The direct payment interface 600 may include various data from the dynamic transaction record 123A including cost data 280, time data 284, photo data 288, and business information 286. The module 131A may also execute instructions to select or enter debtor information 605 and debt amount information 610 within the interface 600. Upon selection or activation of a submit graphic element 615, information entered into the interface 600 as well as data related to a dynamic transaction record 123A corresponding to information initially displayed within the interface 600 may be sent to the payment processing system 112 for routing using the debtor information 605. Information entered into the interface 600 may be stored with the record 123A as an IOU link 292.

Figure 7:
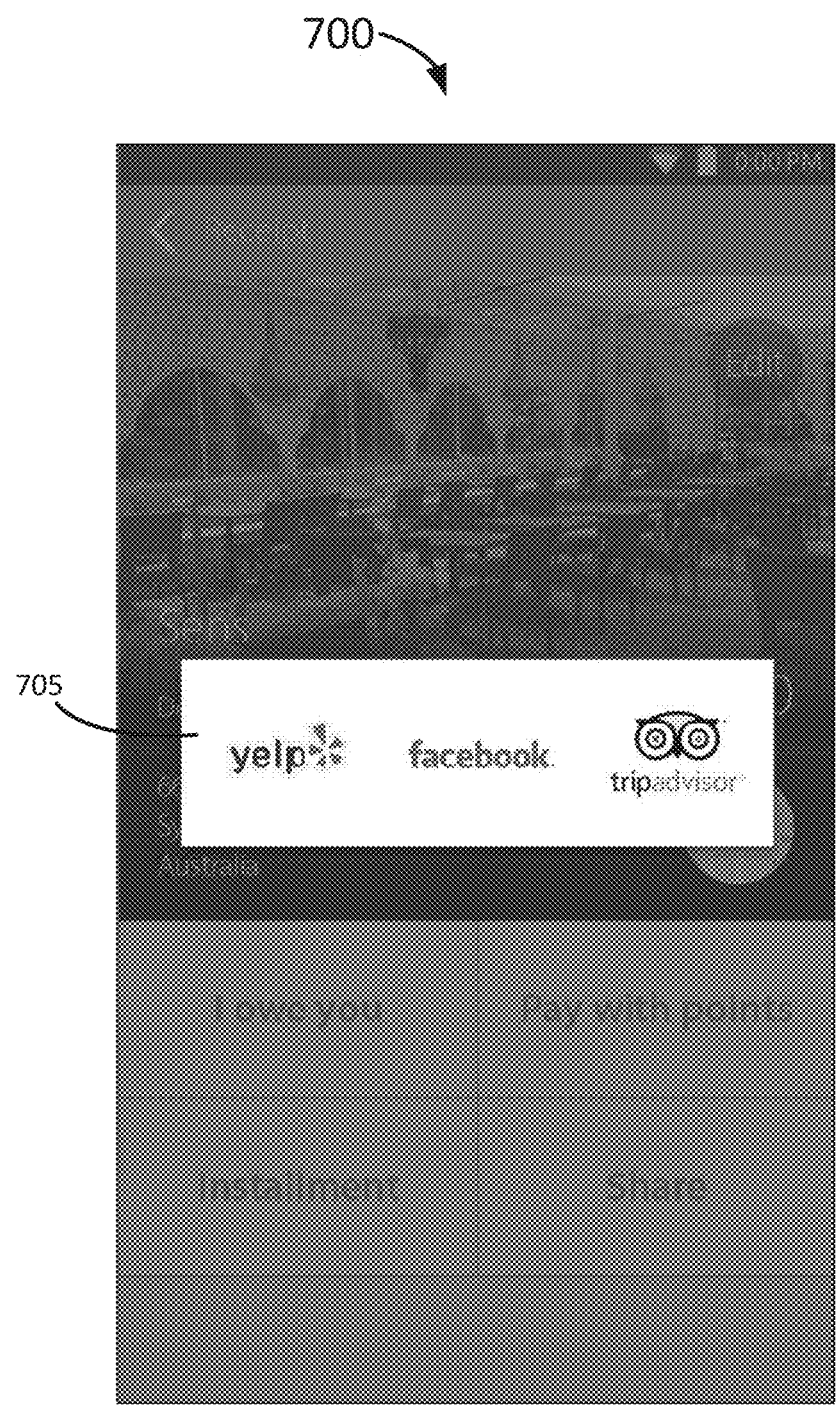
FIG. 7 illustrates an exemplary social media interface for use with the system for linking dynamic information to a payment device transaction record as described herein.

In further embodiments, with reference to FIG. 7, selection of one of the first graphic elements 505 may cause the social media module 131B to display a social media interface 700. The interface 700 may include social media graphic elements 705 that, upon selection, cause the social media module 131B to execute one or more instructions to direct a browser or other application executing on the computing device 128 to a social media website. For example, the module 131DB may direct the device browser or activate another application executing on the device 128 to a social media site allowing the user to enter information about the transaction corresponding to the dynamic transaction record 123A via the social media links 290 described above.

Figure 8A:
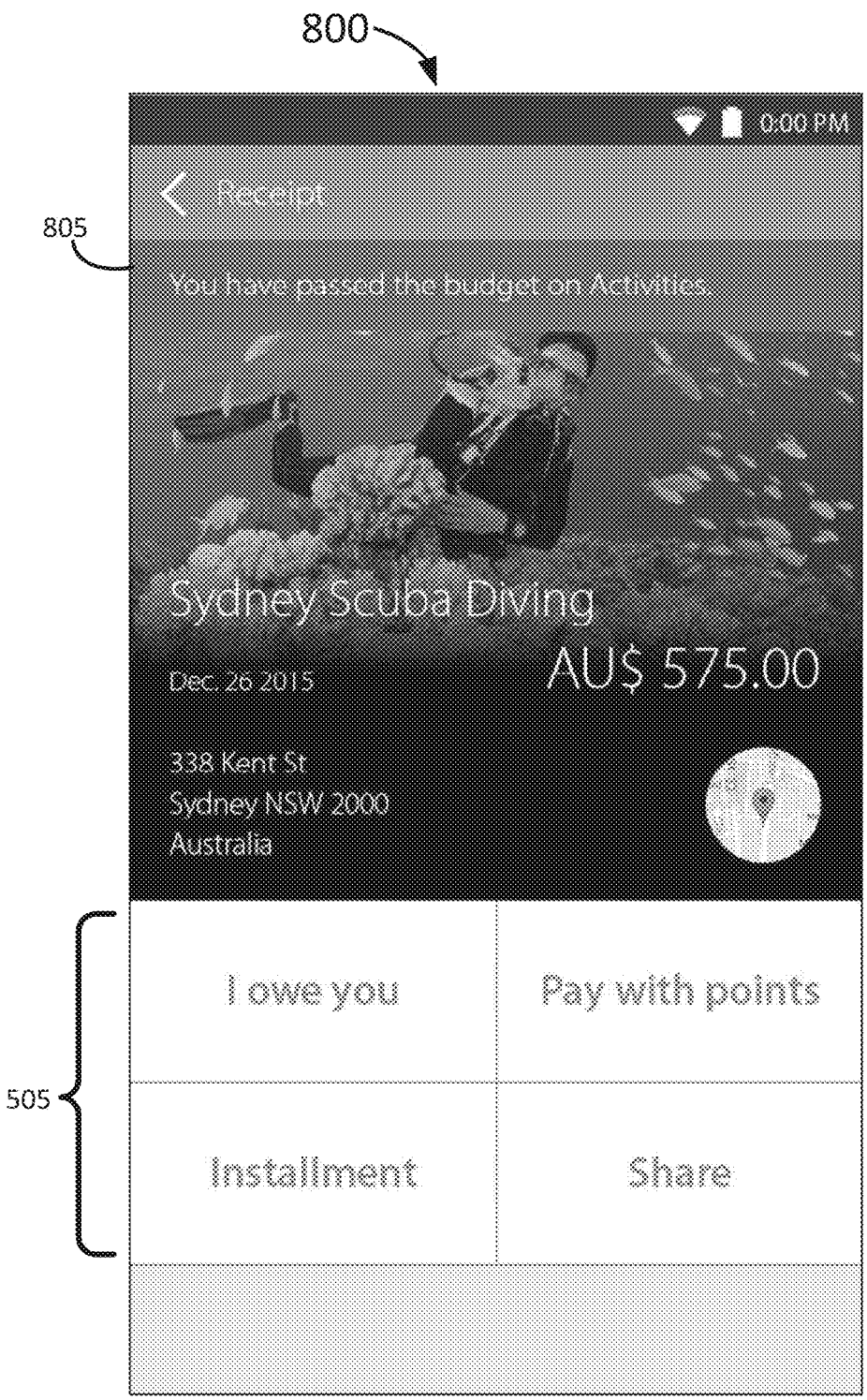
FIG. 8A illustrates another view of an exemplary record detail interface for use with the system for linking dynamic information to a payment device transaction record as described herein.
Figure 8B:
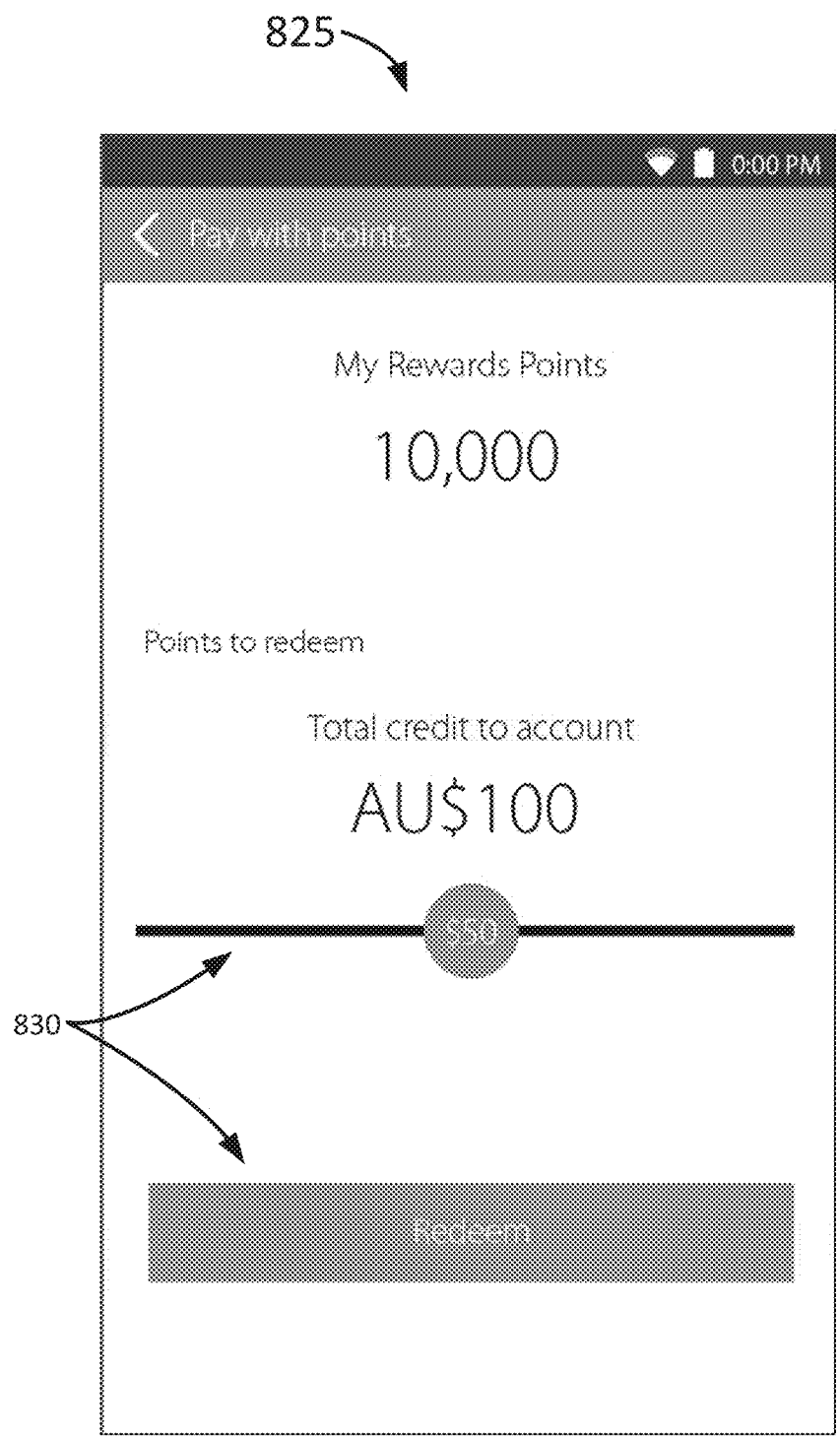
FIGS. 8B and 8C illustrate exemplary views of a first micro transactions interface and a second micro transactions interface, respectively, for use with the system for linking dynamic information to a payment device transaction record as described herein.
Figure 8C:
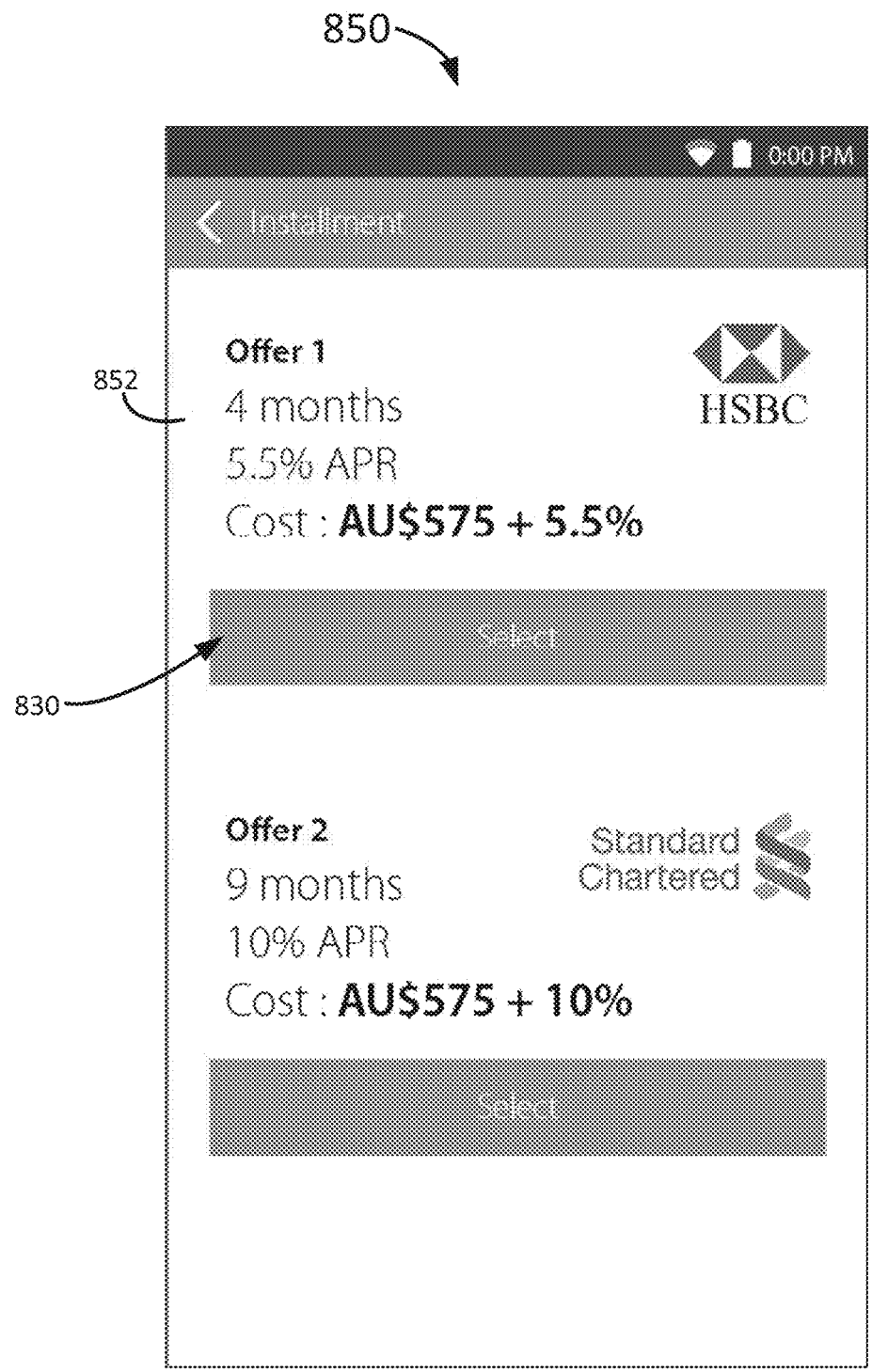

In still further embodiments, with brief reference to FIG. 8A, the alert module 130E may execute an instruction to display an alert message 805 within another record detail interface 800 when a budget variable amount reaches a particular level. For example, with reference to FIG. 3D, the one or more budget variables 306 may configure the interface 800 to display a budget indication 805 upon receiving an indication from the payment processing system 112 that a number of transaction records 123A show the user exceeding one or more of the budget variables 306. With reference to FIG. 8B, selection of one of the first graphic elements 505 may cause the micro transactions module 131C to display a first micro transactions interface 825. The interface 825 may include one or more graphic elements 830 that, upon selection, cause the module 131C to execute an instruction to redeem points or other credits to pay for the transaction represented by the transaction record 123A. Alternatively or additionally, with reference to FIG. 8B, selection of one of the first graphic elements 505 may cause the micro transactions module 131C to display a second micro transactions interface 850 including one or more offers 852 for alternate financing to pay for the transaction that cause the alert module 130E to execute instructions to display the alert message 805. Selection or activation of the graphic object 830 may cause the micro transaction module 131C to execute instructions to initiate an installment or other type of loan for the transaction.

Figure 9:
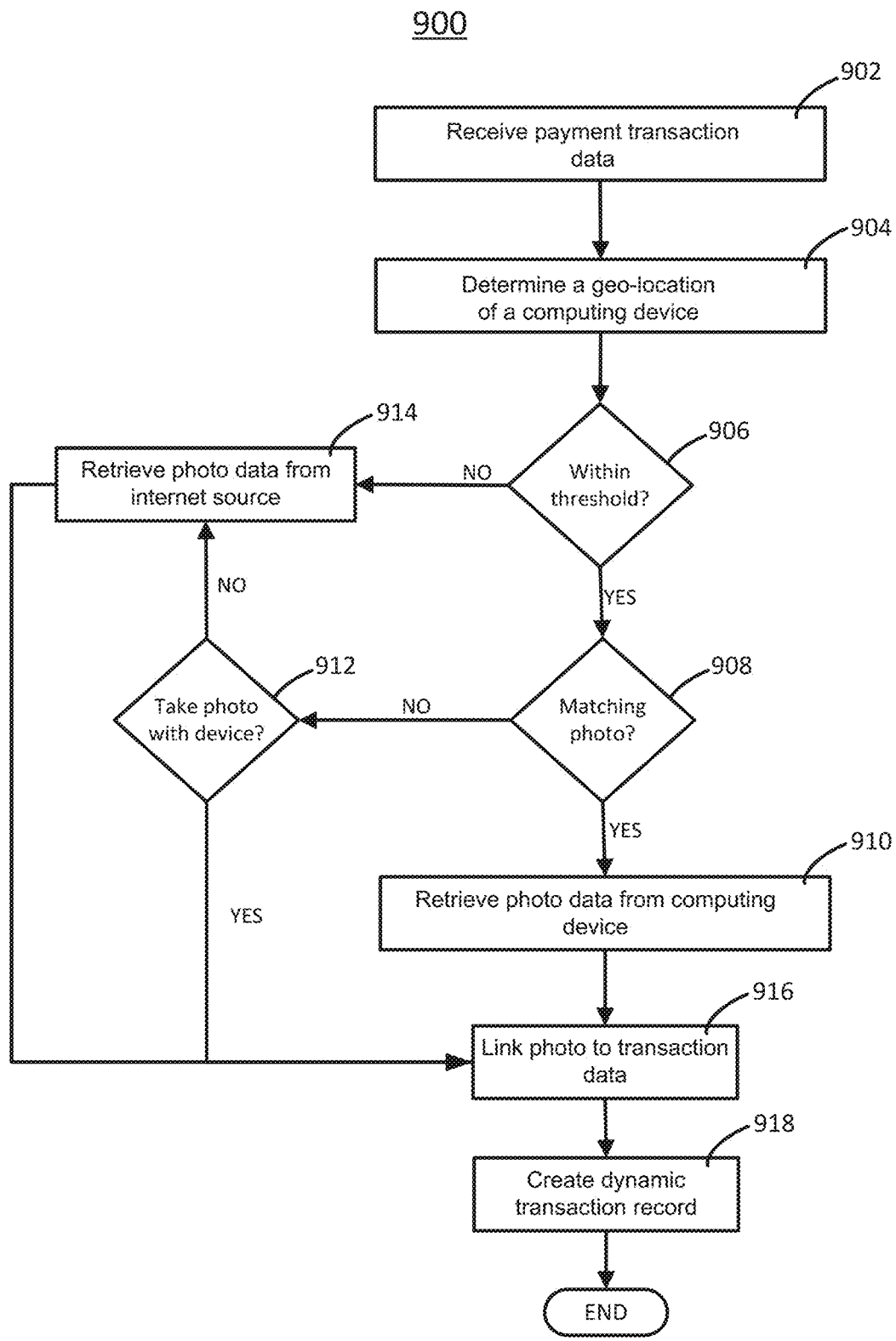
FIG. 9 illustrates an exemplary process flow to link photo data to transaction records for use with the system for linking dynamic information to a payment device transaction record as described herein.

With reference to FIG. 9, a method 900 of creating and interacting with dynamic transaction records 123A within a user interface. Each step of the method may be performed on a server or other computing device including instructions that, when executed by a processor, perform the action or block described herein. At block 902, the method 900 may receive payment transaction data. In some embodiments, the payment transaction data includes one or more of cost data 280, business information 286, location data 282, a time 284, and a customer identification 285. The business information 286 may include a first geo-location including one or more of the point-of-sale (POS) terminal location that sent the payment transaction data, a business location associated with the POS terminal 140, or other data. The time 284 may include a timestamp for the transaction at a point-of-sale terminal, the time the payment processing system received the transaction data, or other data indicating a time when the transaction took place. At block 904, the method 900 may determine a second geo-location. In some embodiments, the second geo-location corresponds to the location data 282 and may include a payment location such as a GPS coordinate received from a location module of the computing device 128 that initiated the payment, or other location data associated with the user of the payment device or corresponding to the customer identification 285.

If, at block 906, the method determines that the first geo-location (the POS terminal 140, business information 286, etc.) is within a threshold distance of the second geo-location (location data 282), then, at block 908, the method may determine if a photo 288 stored at the computing device 128 includes photo geo-location data 291 that is also within the threshold. If so, then at block 910, the method 900 may retrieve that photo 288. If, at block 908, the device 128 does not include a photo 288 stored at the computing device 128 that includes photo geo-location data 291A that is also within the threshold, then the method 900 may initiate a photo-taking procedure at block 912. In some embodiments, the threshold distance includes any distance less than ten meters from the POS terminal location. In other embodiments, the threshold distance includes any distance configured by the user of the device 128 from which the transaction could be identified.

If, at block 906, the method 900 determines that the first geo-location is not within the threshold distance of the second geo-location, or, at block 912, the initiated photo-taking procedure does not result in a usable photo, then, at block 914, the method 900 may retrieve a photo from an internet source. In some embodiments, the method 900 may retrieve a photo from an internet-based mapping application, a social media site, an internet business listing, or other source where the photo includes an image of the business or service that is the subject of the transaction data.

If, at block 912, the method 900 results in a photo 288 of the business, a selfie, or other photo data that includes photo geo-location data 291A matching the first and second geo-location, then, at block 916, the method 900 may link the taken photo with the received transaction data. Alternatively, after retrieving the matching photo at block 916, or retrieving photo data from the internet source at block 914, the method 900 may also link the taken photo with the received transaction data at block 916.

At block 918, the method 900 may create a dynamic transaction record 123A including at least the payment transaction data received at block 902 and the photo data 280, and end. Thus, the method 900 may cause the processors 116, 134 of the respective payment processing server 118 and user computing device 128 to execute instructions to link dynamic information, including photos and other information that corresponds to particular transaction information, to a dynamic transaction record 123A.

Figure 10:
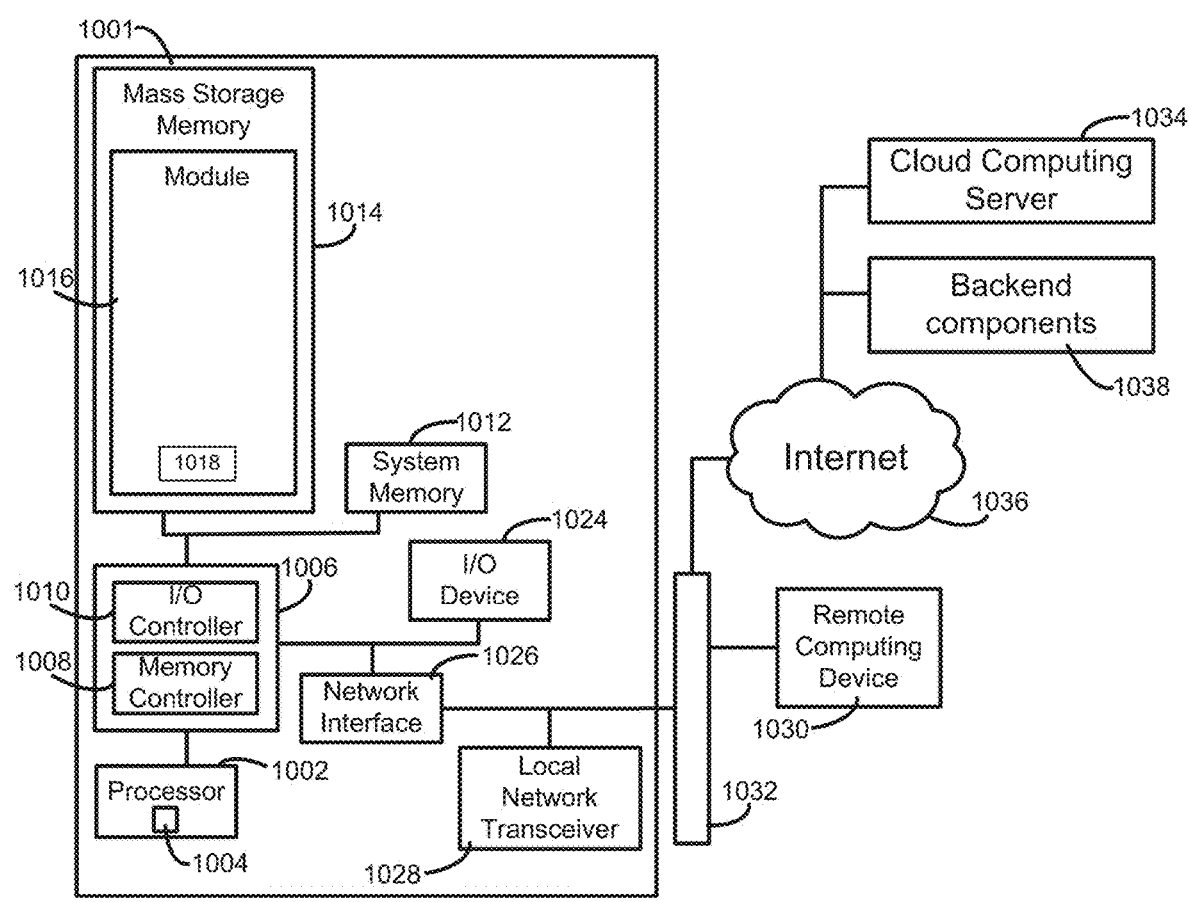
FIG. 10 illustrates an exemplary computing device used within the system for linking dynamic information to a payment device transaction record and to implement the various process flows or methods described herein.

FIG. 10 is a high-level block diagram of an example computing environment 1000 for the system and methods for linking dynamic information, such as photographs, to a payment device transaction record and to create the dynamic transaction record as described herein. The computing device 1001 may include a server (e.g., the payment processing server 118), a mobile computing device (e.g., primary account holder computing device 128, a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods for linking dynamic information, such as photographs, to a payment device transaction record may be used to implement and execute the example systems of FIG. 1. Although the example system 1000 is described below as including a plurality of peripherals, interfaces, chips, memories, etc., one or more of those elements may be omitted from other example processor systems used to implement and execute the example system for linking dynamic information, such as photographs, to a payment device transaction record. Also, other components may be added.

As shown in FIG. 10, the computing device 1001 includes a processor 1002 that is coupled to an interconnection bus. The processor 1002 includes a register set or register space 1004, which is depicted in FIG. 10 as being entirely on-chip, but which could alternatively be located entirely or partially off-chip and directly coupled to the processor 1002 via dedicated electrical connections and/or via the interconnection bus. The processor 1002 may be any suitable processor, processing unit or microprocessor. Although not shown in FIG. 4, the computing device 1001 may be a multi-processor device and, thus, may include one or more additional processors that are identical or similar to the processor 1002 and that are communicatively coupled to the interconnection bus.

The processor 1002 of FIG. 10 is coupled to a chipset 1006, which includes a memory controller 1008 and a peripheral input/output (I/O) controller 1010. As is well known, a chipset typically provides I/O and memory management functions as well as a plurality of general purpose and/or special purpose registers, timers, etc. that are accessible or used by one or more processors coupled to the chipset 1006. The memory controller 1008 performs functions that enable the processor 1002 (or processors if there are multiple processors) to access a system memory 1012 and a mass storage memory 1014, that may include either or both of an in-memory cache (e.g., a cache within the memory 1012) or an on-disk cache (e.g., a cache within the mass storage memory 1014).

The system memory 1012 may include any desired type of volatile and/or non-volatile memory such as, for example, static random access memory (SRAM), dynamic random access memory (DRAM), flash memory, read-only memory (ROM), etc. The mass storage memory 1014 may include any desired type of mass storage device. For example, if the computing device 1001 is used to implement a module 1016 (e.g., the various modules link dynamic information, such as photographs, to a payment device transaction record and to create the dynamic transaction record and other modules as herein described). The mass storage memory 1014 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 1001 and the system 100. Thus, a module, block, function, operation, procedure, routine, step, and method can be implemented in hardware, firmware, and/or software. In one embodiment, program modules and routines are stored in mass storage memory 1014, loaded into system memory 1012, and executed by a processor 1002 or can be provided from computer program products that are stored in tangible computer-readable storage mediums (e.g. RAM, hard disk, optical/magnetic media, etc.).

The peripheral I/O controller 1010 performs functions that enable the processor 1002 to communicate with a peripheral input/output (I/O) device 1024, a network interface 1026, a local network transceiver 1028, (via the network interface 1026) via a peripheral I/O bus. The I/O device 1024 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 1024 may be used with the module 1016, etc., to receive data from the transceiver 1028, send the data to the backend components of the system 100, and perform any operations related to the methods as described herein. The local network transceiver 1028 may include support for a Wi-Fi network, Bluetooth, Infrared, cellular, or other wireless data transmission protocols. In other embodiments, one element may simultaneously support each of the various wireless protocols employed by the computing device 1001. For example, a software-defined radio may be able to support multiple protocols via downloadable instructions. In operation, the computing device 1001 may be able to periodically poll for visible wireless network transmitters (both cellular and local network) on a periodic basis. Such polling may be possible even while normal wireless traffic is being supported on the computing device 1001. The network interface 1026 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 1008 and the I/O controller 1010 are depicted in FIG. 10 as separate functional blocks within the chipset 1006, the functions performed by these blocks may be integrated within a single integrated circuit or may be implemented using two or more separate integrated circuits. The computing environment 1000 may also implement the module 1016 on a remote computing device 1030. The remote computing device 1030 may communicate with the computing device 1001 over an Ethernet link 1032. In some embodiments, the module 1016 may be retrieved by the computing device 1001 from a cloud computing server 1034 via the Internet 1036. When using the cloud computing server 1034, the retrieved module 1016 may be programmatically linked with the computing device 1001. The module 1016 may be a collection of various software platforms including artificial intelligence software and document creation software or may also be a Java® applet executing within a Java® Virtual Machine (JVM) environment resident in the computing device 1001 or the remote computing device 1030. The modeling module 1020 and the execution module 1022 may also be "plug-ins" adapted to execute in a web-browser located on the computing devices 1001 and 1030. In some embodiments, the module 1016 may communicate with back end components 1038 such as the backend components 110 of FIG. 1 via the Internet 1036.

The system 1000 may include but is not limited to any combination of a LAN, a MAN, a WAN, a mobile, a wired or wireless network, a private network, or a virtual private network. Moreover, while only one remote computing device 1030 is illustrated in FIG. 10 to simplify and clarify the description, it is understood that any number of client computers are supported and can be in communication within the system 1000.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A payment device transaction record system comprising:
  a payment processing server including a processor and a memory, the memory storing instructions that are executable by the processor for receiving payment transaction data associated with a transaction for goods or services, the payment transaction data including a first geo-location corresponding to a point-of-sale terminal;
  a mobile computing device including a processor and a memory, the memory storing instructions that are executable by the processor for:
    taking and storing an image at the time of the transaction, the image corresponding to photo data, and
    comparing the first geo-location to a second geo-location corresponding to the photo data, the photo data including the image taken and stored at the time of the first transaction;
  a first module of one or more of the payment processing server and the mobile computing device including a processor and a memory, the memory storing instructions that are executable by the processor for:
    when the first geo-location is determined to be within a threshold distance of a geo-location of the mobile computing device, linking the payment transaction data to the photo data in response to the first geo-location also being within the threshold distance of the second geo-location; and
  a second module of one or more of the payment processing server and the mobile computing device including a processor and a memory, the memory storing instructions that are executable by the processor for:
    initiating the taking and storing the image step at the mobile computing device in response to the first geo-location being outside the threshold distance of the second geo-location, the resulting photo data from the taking and storing the image step including a geo-location and being linked to the payment transaction data when the resulting photo data geo-location matches the first geo-location and the geo-location of the mobile computing device.

2. The system of claim 1, wherein the payment transaction data further includes one or more of cost data, business information, location data, a transaction time, and a customer identification.

3. The system of claim 2, wherein the business information includes a business location associated with the point-of-sale terminal, the transaction time includes a transaction timestamp for the time of the transaction at the point-of-sale terminal, and the photo data further includes a photo timestamp for the time the digital image was taken.

4. The system of claim 1, wherein the second geo-location further corresponds to a GPS coordinate received from a location module of the mobile computing device.

5. The system of claim 1, wherein the threshold distance is less than or equal to ten meters.

6. The system of claim 1, wherein the first module includes a further instruction to retrieve a digital photo from an internet source, the digital photo corresponding to a business associated with the point-of-sale terminal, in response to the first geo-location being outside the threshold distance of the second geo-location.

7. The system of claim 3, wherein the first module includes a further instruction to create a dynamic transaction record including a first transaction record and a second transaction record, the first transaction record including a first cost and a first digital image, the second transaction record including a second cost and a second digital image, wherein the first digital image is larger than the second digital image in response to the first cost being larger than the second cost.

8. The system of claim 3, wherein the first module includes a further instruction to link the payment transaction data to the photo data in response to the transaction timestamp being within a threshold time of the photo timestamp.

9. A method for linking a digital image to a payment transaction record, the method comprising:
  receiving payment transaction data associated with a transaction for goods or services, the payment transaction data including a first geo-location corresponding to a point-of-sale terminal;
  taking and storing an image at the time of the transaction, the image corresponding to photo data;
  comparing the first geo-location to a second geo-location corresponding to the photo data, the photo data including the image taken and stored at the time of the first transaction;
  when the first geo-location is determined to be within a threshold distance of a geo-location of the mobile computing device, and in response to the first geo-location also being within the threshold distance of the second geo-location, linking the payment transaction data to the photo data; and
  initiating the taking and storing the image step at the mobile computing device in response to the first geo-location being outside the threshold distance of the second geo-location, the resulting photo data from the taking and storing the image step including a geo-location and being linked to the payment transaction data when the resulting photo data geo-location matches the first geo-location and the geo-location of the mobile computing device;
  wherein the linking of the payment transaction data to the respective photo data is in a created dynamic transaction record including the payment transaction data and the respective photo data.

10. The method of claim 9, wherein the payment transaction data further includes one or more of cost data, business information, location data, a transaction time, and a customer identification.

11. The method of claim 10, wherein the business information includes a business location associated with the point-of-sale terminal, the transaction time includes a transaction timestamp for the time of the transaction at the point-of-sale terminal, and the photo data further includes a photo timestamp for the time a digital image was taken.

12. The method of claim 9, wherein the second geo-location further corresponds to a GPS coordinate received from a location module of the mobile computing device.

13. The method of claim 9, wherein the threshold distance is less than or equal to ten meters.

14. The method of claim 9, further comprising, in response to the first geo-location being outside the threshold distance of the second geo-location, retrieving a digital photo from an internet source, the digital photo corresponding to a business associated with the point-of-sale terminal.

15. The method of claim 11, further comprising creating a dynamic transaction record including a first transaction record and a second transaction record, the first transaction record including a first cost and a first digital image, the second transaction record including a second cost and a second digital image, wherein the first digital image is larger than the second digital image in response to the first cost being larger than the second cost.

16. The method of claim 11, further comprising, in response to the transaction timestamp being within a threshold time of the photo timestamp, linking the payment transaction data to the photo data.

* * * * *